United States Patent
Murooka

(10) Patent No.: US 8,086,107 B2
(45) Date of Patent: Dec. 27, 2011

(54) OPTICAL-ELECTRICAL HYBRID INTEGRATED CIRCUIT

(75) Inventor: Kenichi Murooka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 894 days.

(21) Appl. No.: 12/033,330

(22) Filed: Feb. 19, 2008

(65) Prior Publication Data

US 2008/0292319 A1 Nov. 27, 2008

(30) Foreign Application Priority Data

Mar. 23, 2007 (JP) ................................. 2007-077388

(51) Int. Cl.
*H04B 10/00* (2006.01)
(52) U.S. Cl. ....................................... 398/115; 398/164
(58) Field of Classification Search .................. 398/115, 398/164
See application file for complete search history.

(56) References Cited

U.S. PATENT DOCUMENTS

2008/0092570 A1 * 4/2008 Choi .............................. 62/157

FOREIGN PATENT DOCUMENTS

| JP | 2006-23777 | 1/2006 |
| JP | 2006-91241 | 4/2006 |

* cited by examiner

*Primary Examiner* — Leslie Pascal
(74) *Attorney, Agent, or Firm* — Oblon, Spivak, McClelland, Maier & Neustadt, L.L.P.

(57) ABSTRACT

An operating unit performs a prescribed operation and includes a standby-state-signal generating unit that generates a standby state signal for switching between a standby state and an operation state of the operating unit in a first part of the operating unit. An optical-signal transmitting unit converts an electric signal, which is a result of the operation in a second part of the operating unit, into an optical signal, transmits the optical signal to a third part of the operating unit, and then converts the optical signal into the electric signal. A power-supply control unit controls a supply of the electric power to the operating unit and a supply of the electric power to the optical-signal transmitting unit by a power supply unit in response to the standby state signal.

8 Claims, 10 Drawing Sheets

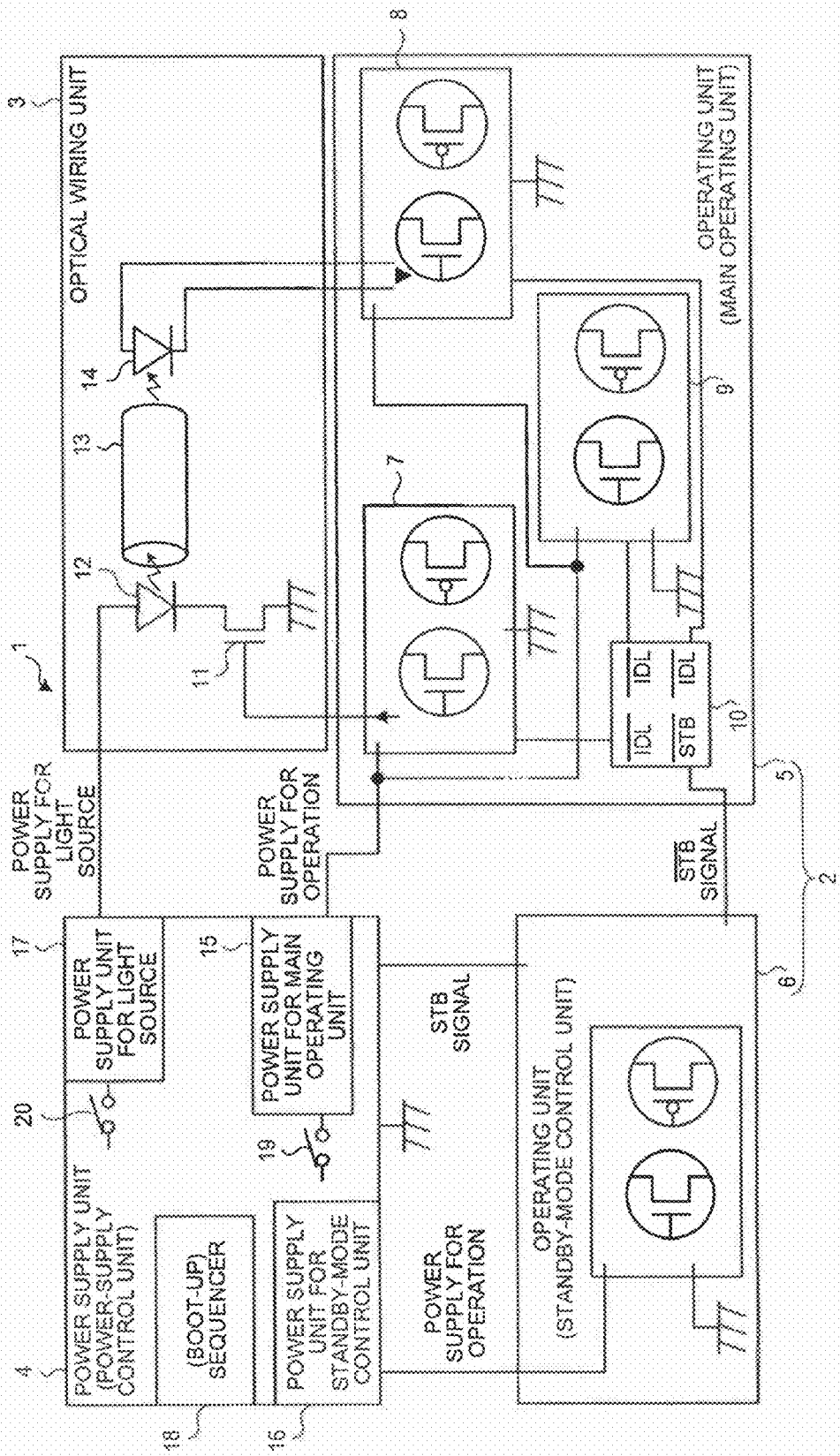

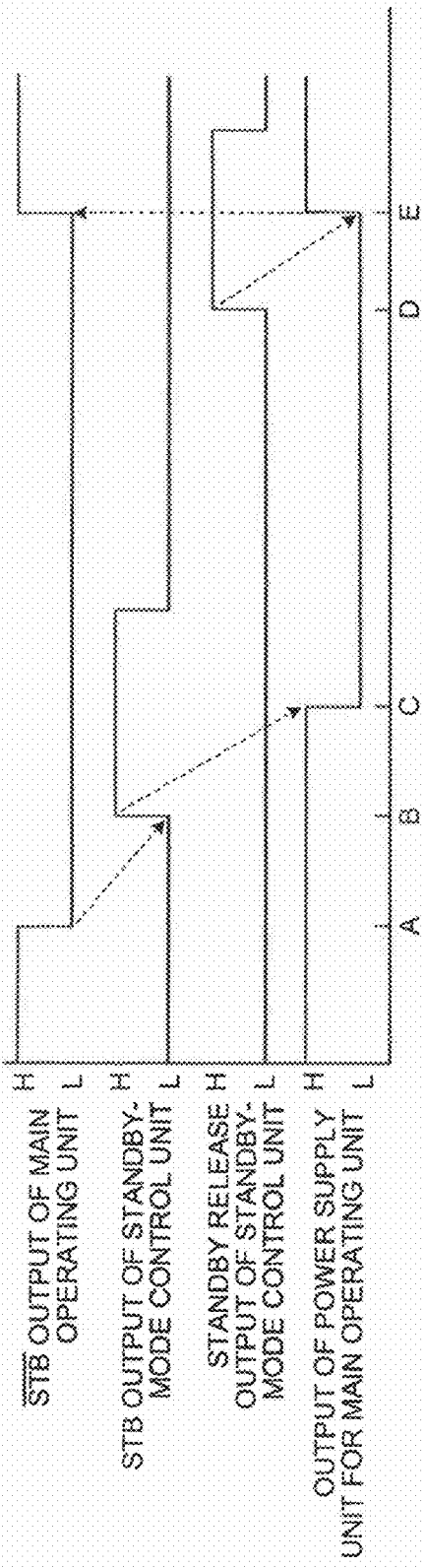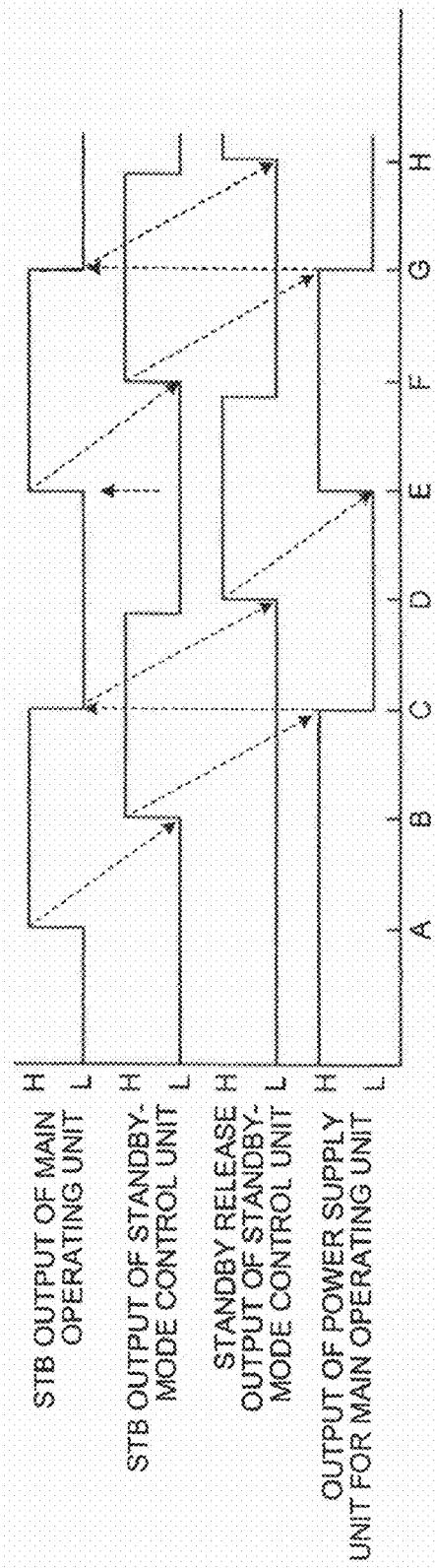

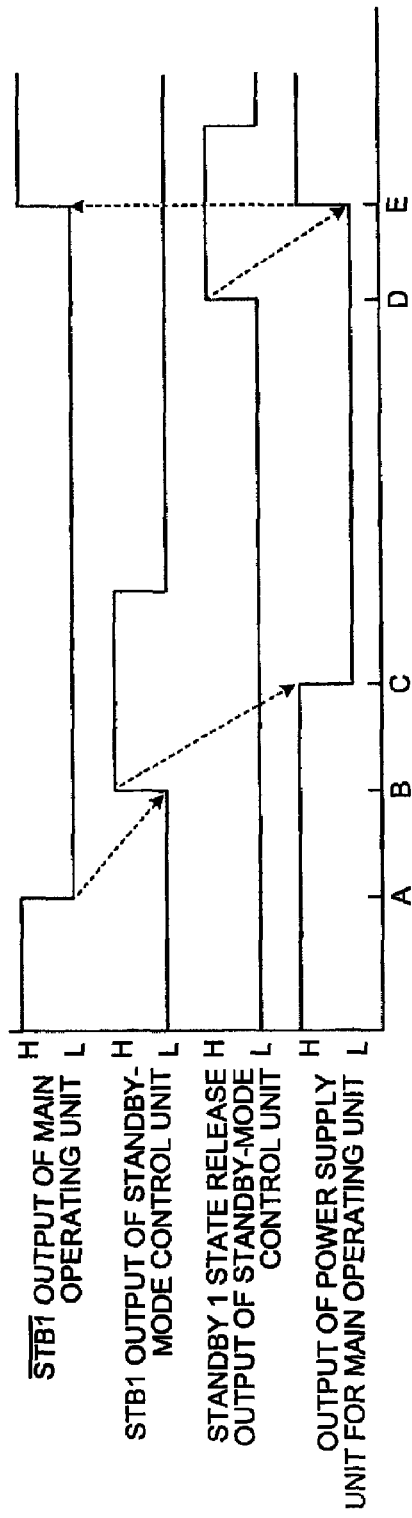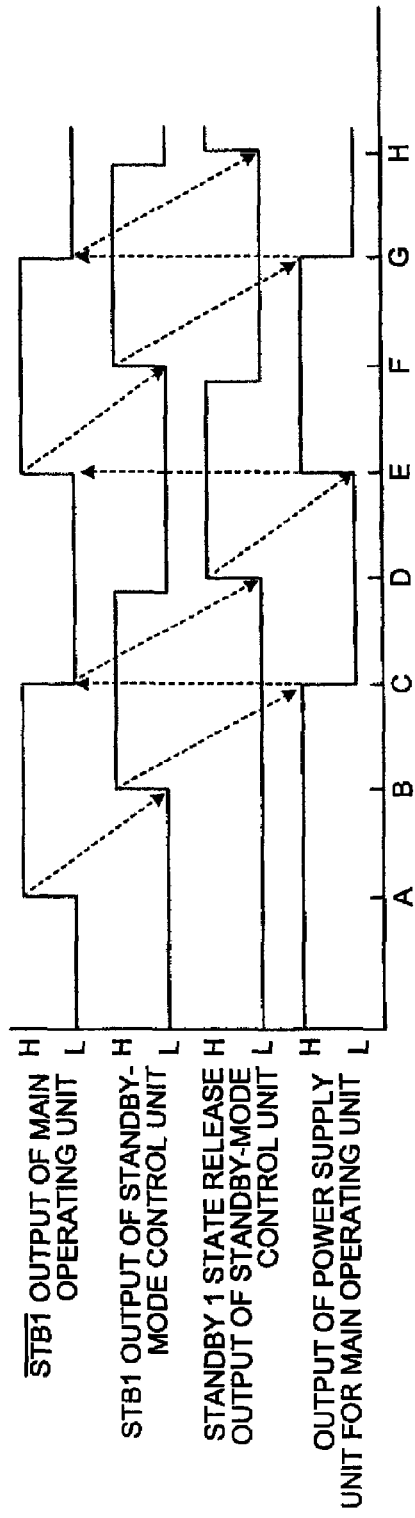

OPTICAL-ELECTRICAL HYBRID INTEGRATED CIRCUIT

CROSS-REFERENCE TO RELATED APPLICATIONS

This application is based upon and claims the benefit of priority from the prior Japanese Patent Application No. 2007-077388, filed on Mar. 23, 2007; the entire contents of which are incorporated herein by reference.

BACKGROUND OF THE INVENTION

1. Field of the Invention

The present invention relates to an optical-electrical hybrid integrated circuit.

2. Description of the Related Art

In recent years, according to an increase in an integration degree of a semiconductor device, a circuit pattern of an LSI element forming the semiconductor device is further refined. According to the refining of the circuit patterns, a decrease in a sectional area of a wiring leads to an increase in a wiring resistance inevitably. Also a decrease in a space between adjacent wirings causes an increase in an electrostatic capacity between the wirings. Therefore, a signal delay time proportional to a product of an electric resistance and an electrostatic capacity of the wirings increases to cause difficulties in increasing speed of a circuit operation.

Conventionally, a method of reducing a signal delay using multiple wiring layers has been used. However, an increase in a total number of wiring layers means an increase in lithography steps. Cost of lithography steps occupies most of production cost in these days. Thus, the multiple wiring layers lead to an increase in product cost. As a decrease in a wiring resistance means an increase in an electric current, power consumption increases in case of fixed power supply voltage. Therefore, it is necessary to devise another means for a reduction in power consumption.

On the other hand, as a technology for fundamentally solving such a problem of wiring, an optical wiring technology for transmitting a signal using light instead of an electric signal attracts attention. In the optical wiring, an optical waveguide is used for propagation of a signal instead of a metal wiring. Speed of the signal propagating through the optical waveguide depends on only a refractive index of the optical waveguide and is usually about ½ to ⅓ of light speed in the vacuum. Therefore, the optical wiring is prospective as, in particular, a technique replacing a wiring in a long distance. However, power consumption per one light-emitting element used in combination with the optical waveguide is incomparably large compared with power consumption per one usual semiconductor element for operation. Therefore, it is difficult to realize a reduction in power consumption.

To cope with this problem, for example, JP-A 2006-91241 (KOKAI) discloses an optical/electrical composite wiring component that can realize power saving by shutting down an electricity-light conversion unit and a light-electricity conversion unit in an optical wiring.

However, in an optical-electrical hybrid integrated circuit, when the optical wiring is built in a semiconductor integrated circuit, the optical wiring is used in an intermediate section for connecting respective stages of the integrated circuit. Therefore, if the supply of electric power to a light-emitting element is stopped without deliberate thought, signal transmission to circuits in post stages is stopped, and it is likely that normal operations of the circuits is not guaranteed.

SUMMARY OF THE INVENTION

An optical-electrical hybrid integrated circuit according to one aspect of the present invention includes an operating unit that performs a prescribed operation, wherein the operating unit includes a standby-state-signal generating unit that generates a standby state signal for switching between a standby state and an operation state of the operating unit in a first part of the operating unit; an optical-signal transmitting unit that converts an electric signal, which is a result of the operation in a second part of the operating unit, into an optical signal, transmits the optical signal to a third part of the operating unit, and then converts the optical signal into the electric signal; a power supply unit that supplies an electric power to the operating unit and the optical-signal transmitting unit; and a power-supply control unit that controls a supply of the electric power to the operating unit and a supply of the electric power to the optical-signal transmitting unit. The power-supply control unit controls the supply of the electric power to the optical-signal transmitting unit and the supply of the electric power to the operating unit in response to the standby state signal.

An optical-electrical hybrid integrated circuit according to another aspect of the present invention includes an operating unit that performs a prescribed operation, wherein the operating unit includes a standby-state-signal generating unit that generates a first standby state signal for switching between a standby state and an operation state of the operating unit, and a second standby state signal for switching between a standby state and an operation state of the operating unit, in a first part of the operating unit; an optical-signal transmitting unit that converts an electric signal, which is a result of the operation in a second part of the operating unit, into an optical signal, transmits the optical signal to a third part of the operating unit, and then converts the optical signal into the electric signal; a stabilizing unit that stabilizes an operation state of the optical-signal transmitting unit; a power supply unit that supplies an electric power to the operating unit, the optical-signal transmitting unit, and the stabilizing unit; and a power-supply control unit that controls a supply of the electric power to the operating unit, a supply of the electric power to the optical-signal transmitting unit, and a supply of the electric power to the stabilizing unit. The power-supply control unit controls the supply of the electric power to the operating unit and the supply of the electric power to the optical-signal transmitting unit in response to the first standby state signal, and controls the supply of the electric power to the operating unit, the supply of the electric power to the optical-signal transmitting unit, and the supply of the electric power to the stabilizing unit in response to the second standby state signal.

BRIEF DESCRIPTION OF THE DRAWINGS

FIG. 1 is a schematic diagram of the structure of an optical-electrical hybrid integrated circuit according to a first embodiment of the present invention;

FIGS. 2A and 2B are timing charts of standby mode control;

FIGS. 8A and 8B are timing charts of a standby 1 state control;

DETAILED DESCRIPTION OF THE INVENTION

Figure 3A:
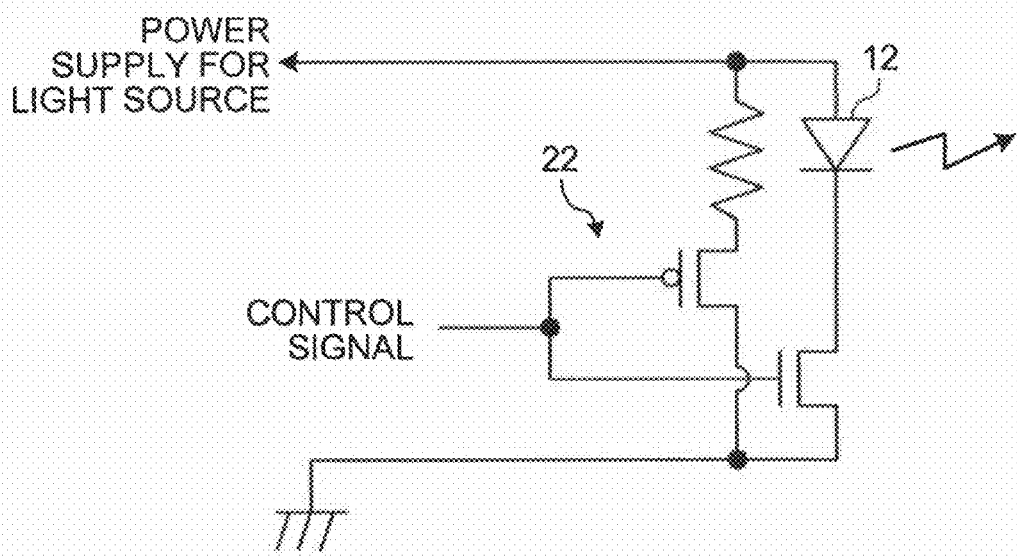
FIGS. 3A and 3B are schematic diagrams for explaining another method with which a light-emitting element driving unit drives a light-emitting element.

Exemplary embodiments of the present invention are explained in detail below with reference to the accompanying drawings.

In FIG. 1, a state of connection of main components is schematically shown. An optical-electrical hybrid integrated circuit 1 according to an embodiment of the present invention includes an operating unit 2, an optical wiring unit 3, and a power supply unit (a power-supply control unit) 4.

The operating unit 2 performs an operation processing and includes a main operating unit 5 and a standby-mode control unit 6. The main operating unit 5 includes a normal CMOS circuit, performs an actual operation processing that the optical-electrical hybrid integrated circuit 1 is required to perform, transmits a standby signal (STB) to the standby-mode control unit 6, and exchanges information with the outside via a input/output unit (not shown).

The main operating unit 5 includes a first operating block 7, a second operating block 8, and a third operating block 9 that individually perform an operation processing and a standby-signal generating unit 10. The first operating block 7 and the second operating block 8 are connected via the optical wiring unit 3. A result of an operation in the first operating block 7 is transmitted to the second operating block 8 through the optical wiring unit 3. The third operating block 9 is not directly connected to the optical wiring unit 3 and only includes electric wirings.

The standby-signal generating unit 10 generates a standby signal (STB) for instructing entrance into a standby mode (a standby state). The standby mode indicates a state in which the optical wiring unit 3 and the main operating unit 5 are stopped and only the standby-mode control unit 6 is operating, i.e., a power supply unit for light source 17 and a power supply unit for main operating unit 15 are turned off and only a power supply unit for standby-mode control unit 16 is operating. Therefore, in the standby mode, power consumption is substantially reduced.

The standby signal (STB) is generated when all the operating blocks in the main operating unit 5 suspend the operation processing. Specifically, the standby-signal generating unit 10 receives, with inverted logic, a signal (IDL) indicating that the first operating block 7, the second operating block 8, and the third operating block 9 in the main operating unit 5 practically suspend the operation processing from the respective operating blocks and performs an OR operation processing to thereby generate the standby signal (STB). A reason for generating the standby signal (STB) with inverted logic is described in detail later.

The standby-mode control unit 6 controls the standby mode in the optical-electrical hybrid integrated circuit 1. Specifically, the standby-mode control unit 6 transmits the standby signal (STB) or a standby mode release signal to the power supply unit 4 to control ON and OFF of the power supply unit 17 and the power supply unit 15, i.e., the supply of electric power to the optical wiring unit 3 and the main operating unit 5. The standby-mode control unit 6 includes a normal CMOS circuit and is not directly connected to the optical wiring. The standby-mode control unit 6 includes only electric wirings. Therefore, even in a state in which a light-emitting element 12 of the optical wiring unit 3 is stopped, it is possible to maintain functions of the standby-mode control unit 6. Functions of the standby-mode control unit 6 are explained in detail later.

The optical wiring unit 3 is connected to the first operating block 7 and the second operating block 8 arranged in the main operating unit 5. The optical wiring unit 3 converts an electric signal as a result of the operation in the first operating block 7 into an optical signal, transmits the optical signal, then, converts the transmitted optical signal back into an electric signal, and transmits the electric signal converted from the optical signal to the second operating block 8. The optical wiring unit 3 includes a light-emitting-element driving unit 11, the light-emitting element 12, an optical waveguide 13, and a photodetecting element 14.

The light-emitting-element driving unit 11 drives the light-emitting element 12 according to the electric signal as the result of the operation in the first operating block 7. The light-emitting-element driving unit 11 includes an NMOSFET. The light-emitting element 12 emits light and converts the electric signal as the result of the operation in the first operating block 7 into an optical signal. The light-emitting element 12 includes a GaInNAs semiconductor laser. A rated current of the light-emitting element 12 is 0.7 mA and a necessary power supply voltage is 1.5 V. Therefore, power consumption during lighting of the light-emitting element 12 is 1.05 mW. This power consumption is by far the larger compared with power consumption in the standby state of the operating unit 2.

The light-emitting-element driving unit 11 drives the light-emitting element 12 and the light-emitting element 12 emits light, whereby the electric signal as the result of the operation in the first operating block 7 is converted into an optical signal. This mechanism is briefly explained. When the electric signal as the result of the operation in the first operating block 7 is transmitted to the light-emitting-element driving unit 11, the NMOSFET of the light-emitting-element driving unit 11 repeats ON and OFF. When the NMOSFET is ON, the light-emitting element 12 emits light because an electric current flows to the light-emitting element 12. When the NMOSFET is OFF, the light-emitting element 12 does not emit light because an electric current does not flow to the light-emitting element 12. The flickering of light by the light-emitting element 12 changes to an optical signal and the electric signal is converted into the optical signal.

The optical waveguide 13 connects the light-emitting element 12 and the photodetecting element 14 and transmits the optical signal generated by the light-emitting element 12 to the photodetecting element 14. The optical waveguide 13 is formed of silicon (Si). When the photodetecting element 14 receives light, the photodetecting element 14 generates electricity corresponding to the intensity of the light. Therefore, the photodetecting element 14 converts the optical signal transmitted thereto through the optical waveguide 13 into the electric signal as the result of the operation in the first operating block 7 and transmits the electric signal to the third operating block 9. The photodetecting element 14 includes an InGaAs photodiode.

The power supply unit 4 supplies electric power to the operating unit 2 and the optical wiring unit 3. The power supply unit 4 includes the power supply unit 15, the power supply unit 16, the power supply unit 17, a (boot-up) sequencer 18, a first switching element 19, and a second switching element 20.

The power supply unit 15 supplies electric power to the main operating unit 5. The power supply unit 16 supplies electric power to the standby-mode control unit 6. The power supply unit 17 supplies electric power to the optical wiring unit 3 (the light-emitting element 12).

Whereas a power supply voltage required by the operating unit 2 (the main operating unit 5 and the standby-mode control unit 6) is 1.0 V, a power supply voltage required by the light-emitting element 12 of the optical wiring unit 3 is 1.5 V as described above. Therefore, the power supply unit 4 supplies two different output voltages. These voltages are generated from a common input voltage by a so-called DC-DC converter.

During starting, the sequencer 18 functions as a boot-up sequencer and performs an initialization operation for a system. During reset from the standby mode, the sequencer 18 performs control of an order for resuming outputs of the respective units of the power supply unit 4.

The first switching element 19 switches the supply of electric power to the power supply unit 15 and the interruption of the electric power based on the standby signal (STB) and the standby mode release signal. The first switching element 19 is a control circuit in the power supply unit 14 and arranged on an input side of the power supply unit 15. The second switching element 20 switches the supply of electric power to the power supply unit 17 and the interruption of the electric power based on the standby signal (STB) and the standby mode release signal. The second switching element 20 is a control circuit in the power supply unit 4 and arranged on an input side of the power supply unit 17.

The first switching element 19 and the second switching element 20 can also be arranged on output sides of the power supply unit 15 and the power supply unit 17, respectively. However, it is more desirable to arrange the first switching element 19 and the second switching element 20 on the input sides because it is possible to further reduce electric power consumed by the power supply unit 4 itself including the DC-DC converter.

The electric power consumed by the power supply unit 4 itself includes electric power necessary for processing for obtaining constant voltage. A value of the electric power depends not only on an actual output current but also on a maximum output current that can be output. Therefore, to reduce power consumption, it is effective to shut down a power supply input to a power supply having a large maximum output current.

A mechanism of standby mode control by the standby-mode control unit 6 is explained in detail. FIG. 2A is a timing chart of standby mode control actually used in the embodiment.

When the standby signal (STB) is received from the main control unit 5 (time A in FIG. 2A), the standby-mode control unit 6 judges whether the optical-electrical hybrid integrated circuit 1 finally enters the standby mode. Even when the standby signal (STB) is received from the input/output unit (not shown), the standby-mode control unit 6 performs the same judgment. When it is judged that the optical-electrical hybrid integrated circuit 1 enters the standby mode, the standby-mode control unit 6 transmits the standby signal (STB) to the power supply unit 4 (time B in FIG. 2A).

When the standby signal (STB) is received, the power supply unit 4 turns off the second switching element 20 and the first switching element 19 to thereby interrupt the supply of electric power to the power supply unit 17 and the power supply unit 15 (time C in FIG. 2A). Thereafter, the optical-electrical hybrid integrated circuit 1 operates in the standby mode. As a result, power consumption of the optical-electrical hybrid integrated circuit 1 is substantially reduced.

Even while the optical-electrical hybrid integrated circuit 1 is operating in the standby mode, electric power is continuously supplied to the standby-mode control unit 6 from the power supply unit 16. Thus, it is possible to perform control of the standby mode. For example, while the optical-electrical hybrid integrated circuit 1 is operating in the standby mode, when an inquiry signal about an operation state is input from the outside via the input/output unit (not shown), the standby-mode control unit 6 can perform control for returning a signal for informing that the optical-electrical hybrid integrated circuit 1 is in the standby mode.

While the optical-electrical hybrid integrated circuit 1 is operating in the standby mode, the standby-mode control unit 6 can always continuously transmit the signal for informing that the optical-electrical hybrid integrated circuit 1 is in the standby mode regardless of whether there is an inquiry from the outside. However, because the continuous transmission of the signal causes an increase in power consumption, it is desirable to adopt the form described above.

While the optical-electrical hybrid integrated circuit 1 is operating in the standby mode, when the standby mode release signal instructing release of the standby mode is received from the input/output unit (not shown) or the main operating unit 5 (time D in FIG. 2A), the standby-mode control unit 6 transmits the standby mode release signal to the power supply unit 4 (time E in FIG. 2A).

When the standby mode release signal is received, the power supply unit 4 turns on the second switching element 20 and the first switching element 19 based on the instruction of the sequencer 18 to thereby sequentially resume the supply of electric power to the power supply unit 17 and the power supply unit 15 (time E in FIG. 2A). Consequently, the function of the main operating unit 5 employing the optical wiring unit 3 is enabled. In response to the resumption of the supply of electric power, the main operating unit 5 performs initialization processing such as confirmation of an internal memory state. Thus, it is possible to receive an instruction for signal processing from the input/output unit. In this way, the optical-electrical hybrid integrated circuit 1 operates in the normal state.

As described above, a normal operation state and an operation state in the standby mode are appropriately switched according to an operation processing state of the main operating unit. Consequently, the optical-electrical hybrid integrated circuit 1 can efficiently consume electric power while performing a normal operation processing. As a result, it is possible to substantially reduce power consumption.

In the embodiment, the standby-mode control unit 6 receives the standby signal (STB) from the main operating unit 5 with inverted logic. In other words, the standby-signal generating unit 10 generates the standby signal (STB) with inverted logic. This makes it possible to prevent a situation in which, when the optical-electrical hybrid integrated circuit 1 enters the standby mode and the supply of electric power to the main operating unit 5 is stopped, all signals output from the main operating unit 5 fall to 0 V and the standby signal (STB) from the main operating unit 5 is apparently inverted. A reason for this is explained using FIG. 2B.

FIG. 2B is a timing chart of standby mode control at the time when the standby-mode control unit 6 does not receive the standby signal (STB) from the main operating unit 5 with inverted logic. When the standby signal (STB) is received from the main operating unit 5 (time A in FIG. 2B) and the standby-mode control unit 6 judges that the optical-electrical hybrid integrated circuit 1 enters the standby mode, the standby-mode control unit 6 transmits the standby signal (STB) to the power supply unit 4 (time B in FIG. 2B). When the standby signal (STB) is received, the power supply unit 4 interrupts the supply of electric power to the power supply unit 17 and the power supply unit 15 (time C in FIG. 2B). Thereafter, the optical-electrical hybrid integrated circuit 1 operates in the standby mode.

However, the main operating unit 5, the supply of electric power to which is interrupted, cannot maintain the standby signal (STB) and automatically outputs 0 V (an L level) (time C in FIG. 2B). Then, the standby-mode control unit 6 considers that the standby signal (STB) is inverted and outputs the standby mode release signal to the power supply unit 4 (time D in FIG. 2B). As a result, the power supply unit 17 and the power supply unit 15 resume the supply of electric power. Simultaneously with the resumption of the supply of electric power, the main operating unit 5 outputs the standby signal (STB) again (the standby signal (STB) changes to an H level) (time E in FIG. 2B). Therefore, a state at time E is the same as a state at time A and the system automatically repeats the same operation (times E to H in FIG. 2B). As a result, the system falls into an oscillation state and cannot maintain the operation in the standby mode.

To prevent this problem, it is possible to design the arithmetic circuit of the standby-mode control unit 6 to use only a rising edge portion of the standby signal (STB) from the main operating unit 5 (when the optical-electrical hybrid integrated circuit 1 enters the standby state) and neglect a falling edge portion (when the optical-electrical hybrid integrated circuit 1 returns from the standby state). However, an area necessary for such an arithmetic circuit is by far the larger compared with an addition of only one NOT circuit in the case of the use of inverted logic.

By performing system design using inverted logic, it is possible to surely give, with simple circuit design, an instruction for the shift to the standby mode from the main operating unit 5 to the standby-mode control unit 6.

As a method with which the light-emitting-element driving unit drives the light-emitting element, besides the method shown in FIG. 1, it is also possible to use other methods. In the method shown in FIG. 1, because the NMOSFET as the light-emitting-element driving unit 11 can also play a role of a resistor for current adjustment, the structure is simplest. However, because a relatively large current of 0.7 mA is switched at high speed, it is highly likely that a power supply wire and a ground wire include noise. Therefore, in design, it is necessary to pay attention to an arrangement and the like of the power supply wire and the ground wire. As a result, the design is limited.

On the other hand, in the method shown in FIG. 3A, a light-emitting-element driving unit 22 includes an NMOSFET, a PMOSFET, and a resistor. In this structure, because an electric current flows to a parallel resistance load when an electric current does not flow to the light-emitting element 12, there is an advantage that temporal fluctuation in an electric current flowing through the power supply wire and the ground wire is extremely small. In such a case, because an electric current flows to any one of the loads regardless of ON/OFF of a control signal, for a reduction in power consumption, it is extremely effective to stop the supply of electric power of the power supply unit 17 in the standby mode in which the optical wiring unit 3 is not used.

Figure 3B:
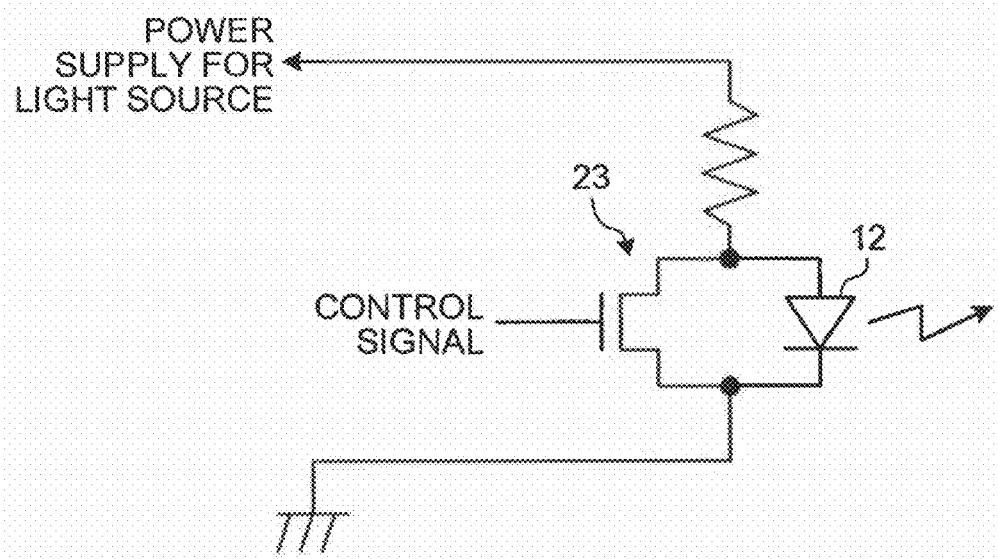

However, in the methods shown in FIGS. 1 and 3A, a current value of a level (or a degree) same as an electric current flowing through the light-emitting element 12 is necessary as a current driving force of the NMOSFET used for driving of the light-emitting element. On the other hand, in a method shown in FIG. 3B, a light-emitting-element driving unit 23 includes an NMOSFET and a resistor. In this structure, when the NMOSFET is in an OFF state, if a series resistance is set such that an electric current exceeding a laser oscillation threshold of a light-emitting element by about 10 to 20 percent flows, a current driving force of the NMOSFET can be sufficiently controlled with 20 to 30 percent of an electric current flowing through the light-emitting element.

If the MOSFET may have a small current driving force, because element dimensions can be set small and design is easy, there is an advantage that it is possible to realize a reduction in cost. In such a case, a certain degree of current flows regardless of ON/OFF of a control signal. Thus, for a reduction in power consumption, it is extremely effective to stop the supply of electric power of the power supply unit 17 in the standby mode in which the optical wiring unit 3 is not used.

As described above, in the optical-electrical hybrid integrated circuit according to the first embodiment, it is possible to substantially reduce power consumption while guaranteeing normal operations of the circuits by providing the standby mode in which the supply of electric power to the optical wiring unit having the light-emitting element with large power consumption and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

A second embodiment of the present invention is different from the first embodiment in the structure of an optical wiring unit. Concerning the structure of an optical-electrical hybrid integrated circuit according to the second embodiment, components different from the first embodiment are explained. Because the other components are the same as those in the first embodiment, the components are denoted by the same reference numerals and signs and explanation of the components is omitted.

Figure 4:
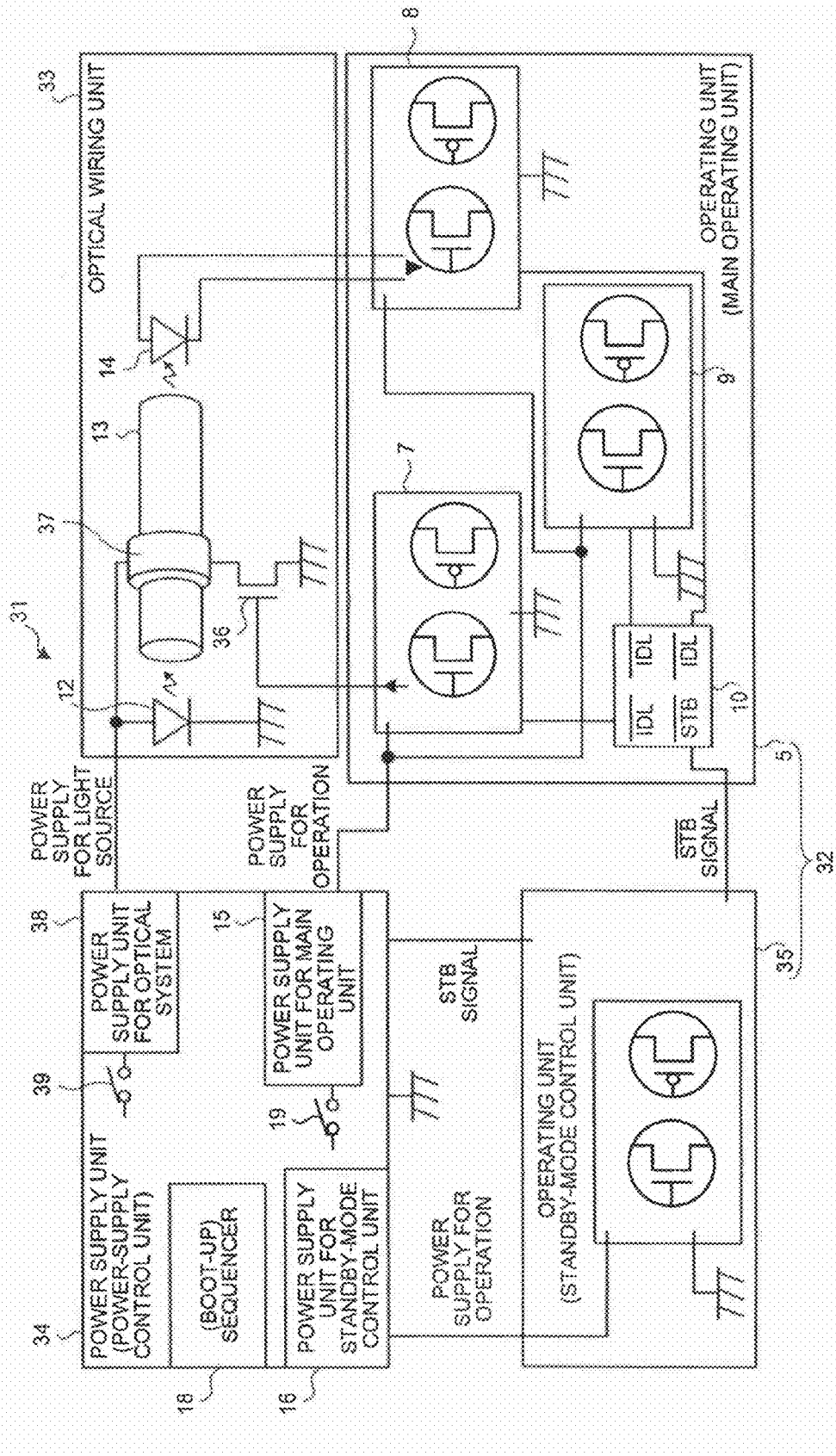
FIG. 4 is a schematic diagram of the structure of an optical-electrical hybrid integrated circuit according to a second embodiment of the present invention.

FIG. 4 is a schematic diagram of a state of connection of main components. An optical-electrical hybrid integrated circuit 31 according to the embodiment includes an operating unit 32, an optical wiring unit 33, and a power supply unit (a power-supply control unit) 34.

The operating unit 32 performs an operation processing and includes the main operating unit 5 and a standby-mode control unit 35. The main operating unit 5 includes the first operating block 7, the second operating block 8, and the third operating block 9 that individually perform an operation processing and the standby-signal generating unit 10.

The standby-signal generating unit 10 generates a standby signal (STB) for instructing entrance into a standby mode (a standby state). The standby mode indicates a state in which the optical wiring unit 33 and the main operating unit 5 are stopped and only the standby-mode control unit 35 is operating, i.e., a power supply unit for optical system 38 and the power supply unit 15 are stopped and only a power supply unit for standby-mode control unit 35 is operating. Therefore, in the standby mode, power consumption is substantially reduced.

The standby-mode control unit 35 controls the standby mode in the optical-electrical hybrid integrated circuit 31. Specifically, the standby-mode control unit 35 transmits a standby signal (STB) or a standby mode release signal to the power supply unit 34 to thereby control ON and OFF of the power supply unit 38 and the power supply unit 15, i.e., the supply of electric power to the optical wiring unit 33 and the main operating unit 5. The standby-mode control unit 35 includes a normal CMOS circuit, is not directly connected to an optical wiring, and includes only electric wirings. Therefore, even in a state in which the light-emitting element 12 of the optical wiring unit 33 is stopped, it is possible to maintain functions of the standby-mode control unit 35. Basically, functions of the standby-mode control unit 35 are the same as the functions of the standby-mode control unit 6 explained in the first embodiment. Thus, detailed explanation of the functions is omitted.

The optical wiring unit 33 is connected to the first operating block 7 and the second operating block 8 arranged in the main operating unit 5. The optical wiring unit 33 converts an electric signal as a result of the operation in the first operating block 7 into an optical signal, transmits the optical signal, then, converts the optical signal into the electric signal, and transmits the electric signal to the second operating block 8. The optical wiring unit 33 includes the light-emitting element 12, an optical-modulator modulating unit 36, an optical modulator 37, the optical waveguide 13, and the photodetecting element 14.

The light-emitting element 12 emits light. The light-emitting element 12 includes a GaInNAs semiconductor laser. In the embodiment, the light-emitting element 12 is always lit when the optical wiring is used. A rated current of the light-emitting element 12 is 0.7 mA and a necessary power supply voltage is 1.5 V. Thus, power consumption during lighting of the light-emitting element 12 is 1.05 mW. This power consumption is by far the larger compared with power consumption in a standby state of the operating unit 32.

The optical-modulator modulating unit 36 modulates the optical modulator 37 according to the electric signal as the result of the operation in the first operating block 7. The optical-modulator modulating unit 36 includes an NMOS-FET.

The optical modulator 37 changes the intensity of light propagating through the optical waveguide 13 and converts the electric signal as the result of the operation in the first operating block 7 into an optical signal. The optical modulator 37 is formed of lithium niobate. A driving voltage of the optical modulator 37 is also designed to be 1.5 V.

The optical-modulator modulating unit 36 modulates the optical modulator 37 and changes the intensity of light emitted by the light-emitting element 12 to thereby convert the electric signal as the result of the operation in the first operating block 7. This mechanism is briefly explained. When the electric signal as the result of the operation in the first operating block 7 is transmitted to the optical-modulator modulating unit 36, the NMOSFET of the optical-modulator modulating unit 36 repeats ON and OFF. As a result, a voltage applied to the optical modulator 37 changes. When light emitted by the light-emitting element 12 always lit passes through the optical modulator 37, according to the change in the voltage applied to the optical modulator 37, the intensity of the light also changes and the intensity of the light received by the photodetecting element 14 also changes. A level of the light changes to an optical signal and the electric signal is converted into the optical signal.

The power supply unit 34 supplies electric power to the operating unit 32 and the optical wiring unit 33. The power supply unit 34 includes the power supply unit 15, the power supply unit 16, the power supply unit 38, the sequencer 18, the first switching element 19, and a second switching element 39.

The power supply unit 38 supplies electric power to the optical wiring unit 33 (the light-emitting element 12 and the optical modulator 37). Whereas a power supply voltage required by the operating unit 32 (the main operating unit 5 and the standby-mode control unit 35) is 1.0 V, the power supply voltage required by the light-emitting element 12 and the optical modulator 37 of the optical wiring unit 33 is 1.5 V as described above. Therefore, the power supply unit 34 supplies these two different output voltages. These voltages are generated from a common input voltage by a so-called DC-DC converter.

The second switching element 39 switches the supply of electric power to the power supply unit 38 and the interruption of the electric power based on the standby signal (STB) and the standby mode release signal. The second switching element 39 is a control circuit in the power supply unit 34 and is arranged on an input side of the power supply unit 38.

The first switching element 19 and the second switching element 39 can also be arranged on output sides of the power supply unit 15 and the power supply unit 38, respectively. However, it is more desirable to arrange the first switching element 19 and the second switching element 39 on the input sides because it is possible to further reduce electric power consumed by the power supply unit 34 itself including the DC-DC converter.

The electric power consumed by the power supply unit 34 itself includes electric power necessary for processing for obtaining constant voltage. A value of the electric power depends not only on an actual output current but also on a maximum output current that can be output. Therefore, to reduce power consumption, it is effective to interrupt a power supply input to a power supply having a large maximum output current.

As described above, in the optical-electrical hybrid integrated circuit according to the second embodiment, it is possible to substantially reduce power consumption while guaranteeing normal operations of the circuits by providing the standby mode in which the supply of electric power to the optical wiring unit having the light-emitting element with large power consumption and the optical modulator and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

A third embodiment according to the present invention is different from the first and second embodiments in that a correspondence between inputs and outputs of an optical wiring unit is represented as a two-to-two relation instead of a one-to-one relation and a standby-mode control unit has a function of controlling not only a power supply unit but also power supplying switches of respective units of a main operating unit and the optical wiring unit.

Figure 5:
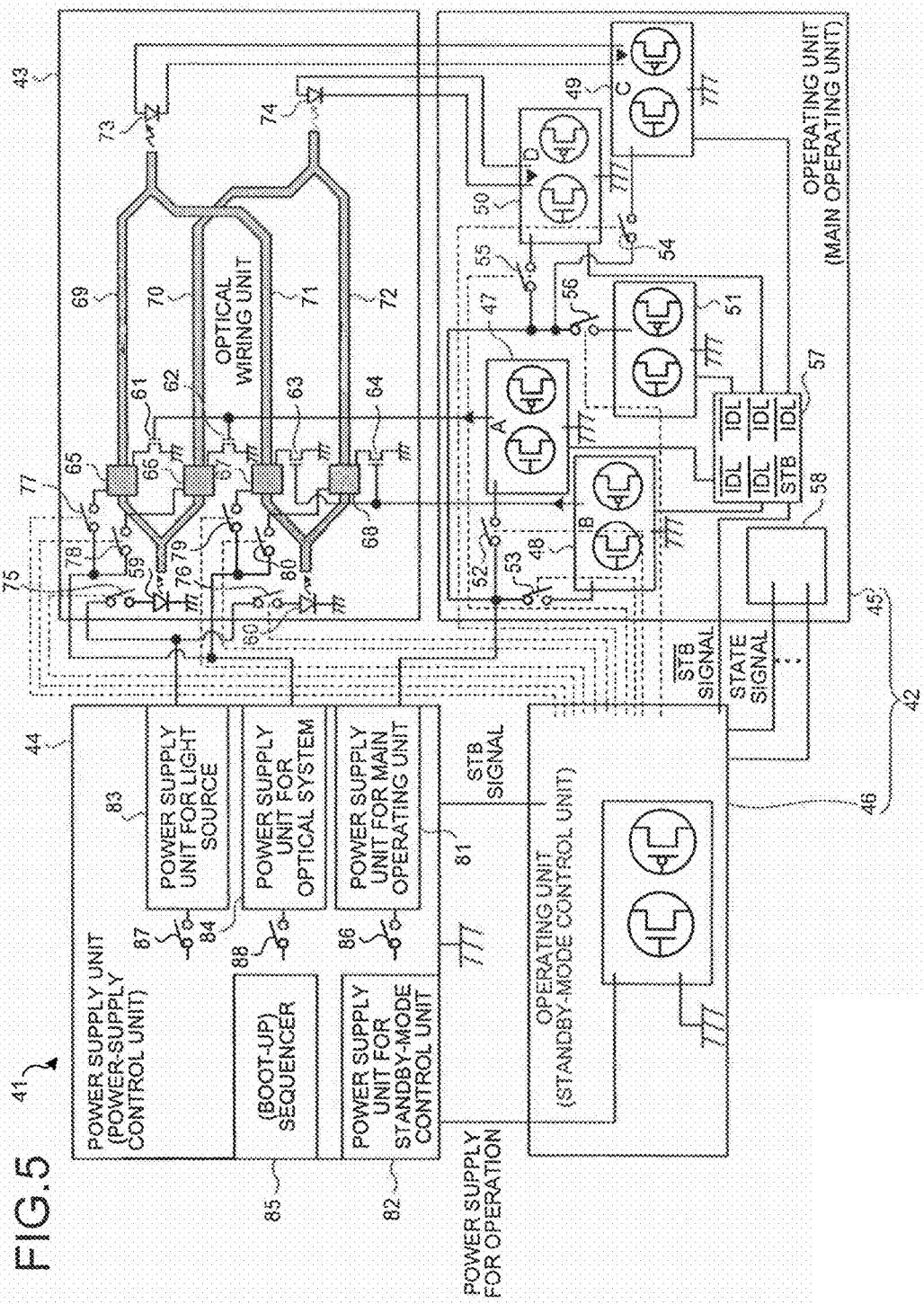
FIG. 5 is a schematic diagram of the structure of an optical-electrical hybrid integrated circuit according to a third embodiment of the present invention.

FIG. 5 is a schematic diagram of a state of connection of main components. An optical-electrical hybrid integrated circuit 41 according to the embodiment includes an operating unit 42, an optical wiring unit 43, and a power supply unit (a power-supply control unit) 44.

The operating unit 42 performs an operation processing and includes a main operating unit 45 and a standby-mode control unit 46. The main operating unit 45 includes a normal CMOS circuit, performs an actual operation processing that the optical-electrical hybrid integrated circuit 41 is required to perform, transmits a standby signal (STB) to the standby-mode control unit 46, exchanges a state signal with the standby-mode control unit 46, and exchanges information with the outside via a input/output unit (not shown).

The main operating unit 45 includes a first operating block 47, a second operating block 48, a third operating block 49, a fourth operating block 50, and a fifth operating block 51 that individually perform an operation processing, a first switch 52, a second switch 53, a third switch 54, a fourth switch 55, and a fifth switch 56, a standby-signal generating unit 57, and a state-signal generating unit 58.

The first operating block 47 is connected to the third operating block 49 and the fourth operating block 50 via the optical wiring unit 43. A result of the operation calculated by the first operating block 47 is transmitted to any one of the third operating block 49 and the fourth operating block 50 or both through the optical wiring unit 43. The second operating block 48 is connected to the third operating block 49 and the fourth operating block 50 via the optical wiring unit 43. A result of the operation calculated by the second operating block 48 is transmitted to any one of the third operating block 49 and the fourth operating block 50 or both through the optical wiring unit 43. The fifth operating block 51 is not directly connected to the optical wiring unit 43 and includes only electric wirings.

The first switch 52 is provided between a power supply unit for main operating unit 81 and the first operating block 47. The first switch 52 switches the supply of electric power from the power supply unit 81 to the first operating block 47 and the interruption of the electric power. The second switch 53 is provided between the power supply unit 81 and the second operating block 48. The second switch 53 switches the supply of electric power from the power supply unit 81 to the second operating block 48 and the interruption of the electric power. The third switch 54 is provided between the power supply unit 81 and the third operating block 49. The third switch 54 switches the supply of electric power from the power supply unit 81 to the third operating block 49 and the interruption of the electric power. The fourth switch 55 is provided between the power supply unit 81 and the fourth operating block 50. The fourth switch 55 switches the supply of electric power from the power supply unit 81 to the fourth operating block 50 and the interruption of the electric power.

The fifth switch 56 is provided between the power supply unit 81 and the fifth operating block 51. The fifth switch 56 switches the supply of electric power from the power supply unit 81 to the fifth operating block 51 and the interruption of the electric power. Switching of ON and OFF of the first switch 52, the second switch 53, the third switch 54, the fourth switch 55, and the fifth switch 56 is performed according to an instruction from the standby-mode control unit 46. A method of switching the respective switches is explained later together with explanation of a state control by the standby-mode control unit 46.

The standby-signal generating unit 57 generates a standby signal (STB) for instructing entrance into a standby mode (a standby state). The standby mode indicates a state in which the optical wiring unit 43 and the main operating unit 45 are stopped and only the standby-mode control unit 46 is operating, i.e., a power supply unit for light source 83, a power supply unit for optical system 84, and the power supply unit 81 are turned off and only a power supply unit for standby-mode control unit 82 is operating. Therefore, in the standby mode, power consumption is substantially reduced.

The standby signal (STB) is generated in a state in which all the operating blocks in the main operating unit 45 suspend the operation processing. Specifically, the standby-signal generating unit 57 receives, with inverted logic, signals (IDL) indicating that the first operating block 47, the second operating block 48, the third operating block 49, the fourth operating block 50, and the fifth operating block 51 in the main operating unit 45 practically suspend the operation processing from the respective operating blocks and performs an OR operation processing to thereby generate the standby signal (STB). The standby-signal generating unit 57 creates the standby signal (STB) with inverted logic. A reason for this is explained in detail later.

The state-signal generating unit 58 generates a state signal representing present and future states of the respective units of the main operating unit 45. Specifically, the state signal represents, based on the operation processing performed by the main operating unit 45, a present operation processing state and a future operation processing state of the first operating block 47, the second operating block 48, the third operating block 49, the fourth operating block 50, and the fifth operating block 51.

The standby-mode control unit 46 controls the standby mode in the optical-electrical hybrid integrated circuit 41. Specifically, the standby-mode control unit 46 transmits the standby signal (STB) or the standby mode release signal to the power supply unit 44 to thereby control ON and OFF of the power supply unit 83, the power supply unit 84, and the power supply unit 81, i.e., the supply of electric power to the optical wiring unit 43 and the main operating unit 45.

Moreover, the standby-mode control unit 46 controls states of the respective operating blocks in the main operating unit 45 and states of respective photodetecting elements and respective optical modulators in the optical wiring unit 43. Specifically, the standby-mode control unit 46 turns on and off, based on a state signal from the main operating unit 45, the first switch 52, the second switch 53, the third switch 54, the fourth switch 55, and the fifth switch 56 to thereby control the supply of electric power to the first operating block 47, the second operating block 48, the third operating block 49, the fourth operating block 50, and the fifth operating block 51.

More specifically, the standby-mode control unit 46 turns on and off, based on a state signal from the main operating unit 45, a sixth switch 75, a seventh switch 76, an eighth switch 77, a ninth switch 78, a tenth switch 79, and an eleventh switch 80 in the optical wiring unit 43 to thereby control the supply of electric power to a first light-emitting element 59, a second light-emitting element 60, a first optical modulator 65, a second optical modulator 66, a third optical modulator 67, and a fourth optical modulator 68.

The standby-mode control unit 46 controls the supply of electric power to the first optical modulator 65, the second optical modulator 66, the third optical modulator 67, and the fourth optical modulator 68. Consequently, it is possible to recombine exchange of data among the respective operating blocks of the main operating unit 45 and cause the main operating unit 45 to function as a multi-function circuit.

The standby-mode control unit 46 controls the supply of electric power to the first operating block 47, the second operating block 48, the third operating block 49, the fourth operating block 50, the fifth operating block 51, the first light-emitting element 59, and the second light-emitting element 60. Consequently, it is possible to substantially reduce power consumption of the optical-electrical hybrid integrated circuit 41.

The standby-mode control unit 46 includes a normal CMOS circuit and is not directly connected to the optical wiring. The standby-mode control unit 6 includes only electric wirings. Therefore, even in a state in which the first light-emitting element 59 and the second light-emitting element 60 of the optical wiring unit 43 are stopped, it is possible to keep functions of the standby-mode control unit 46. A standby-mode control function and a state control function of the standby-mode control unit 46 are explained in detail later.

The optical wiring unit 43 is connected to the first operating block 47, the second operating block 48, the third operating block 49, and the fourth operating block 50 arranged in the main operating unit 45. The optical wiring unit 43 converts electric signals as result of the operations in any one of the first operating block 47 and the second operating block 48 or both into optical signals and transmits the optical signals. The optical wiring unit 43 directly transmits the optical signal as the result of the operation in the first operating block 47 and the optical signal as the result of the operation in the second operating block 48. Alternatively, the optical wiring unit 43 converts optical signals as OR signals of the result of the operation in the first operating block 47 and the result of the operation in the second operating block 48 into electric signals and transmits the electric signals to any one of the third operating block 49 and the fourth operating block 50 or both.

The optical wiring unit 43 includes the first light-emitting element 59, the second light-emitting element 60, a first optical-modulator modulating unit 61, a second optical-modulator modulating unit 62, a third optical-modulator modulating unit 63, a fourth optical-modulator modulating unit 64, the first optical modulator 65, the second optical modulator 66, the third optical modulator 67, the fourth optical modulator 68, a first optical waveguide 69, a second optical waveguide 70, a third optical waveguide 71, a fourth optical waveguide 72, a first photodetecting element 73, a second photodetecting element 74, the sixth switch 75, the seventh switch 76, the eighth switch 77, the ninth switch 78, the tenth switch 79, and the eleventh switch 80.

The first light-emitting element 59 and the second light-emitting element 60 emit light. The first light-emitting element 59 and the second light-emitting element 60 include GaInNAs semiconductor lasers, respectively. In the embodiment, the first light-emitting element 59 and the second light-emitting element 60 are always in a lit state when the optical wiring is used. As described later, the first optical waveguide 69, the second optical waveguide 70, the third optical waveguide 71, and the fourth optical waveguide 72 have branches. Thus, rated currents of the first light-emitting element 59 and the second light-emitting element 60 are 1.0 mA larger than those in the first and the second embodiments and a necessary power supply voltage is 2.0 V. Therefore, power consumptions during lighting of the first light-emitting element 59 and the second light-emitting element 60 are 2.0 mW. The power consumptions are by far the larger compared with power consumption in a standby state of the operating unit 42.

The first optical-modulator modulating unit 61 modulates the first optical modulator 65 according to the electric signal as the result of the operation in the first operating block 47. The second optical-modulator modulating unit 62 modulates the second optical modulator 66 according to the electric signal as the result of the operation in the first operating block 47. The third optical-modulator modulating unit 63 modulates the third optical modulator 67 according to the electric signal as the result of the operation in the second operating block 48. The fourth optical-modulator modulating unit 64 modulates the fourth optical modulator 68 according to the electric signal as the result of the operation in the second operating block 48. The first optical-modulator modulating unit 61, the second optical-modulator modulating unit 62, the third optical-modulator modulating unit 63, and the fourth optical-modulator modulating unit 64 include NMOSFETs, respectively.

The first optical modulator 65 changes the intensity of light propagating through the first optical waveguide 69 and converts the electric signal as the result of the operation in the first operating block 47 into an optical signal. The second optical modulator 66 changes the intensity of light propagating through the second optical waveguide 70 and converts the electric signal as the result of the operation in the first operating block 47 into an optical signal. The third optical modulator 67 changes the intensity of light propagating through the third optical waveguide 71 and converts the electric signal as the result of the operation in the second operating block 48 into an optical signal. The fourth optical modulator 68 changes the intensity of light propagating through the fourth optical waveguide 72 and converts the electric signal as the result of the operation in the second operating block 48 into an optical signal.

The first optical modulator 65, the second optical modulator 66, the third optical modulator 67, and the fourth optical modulator 68 are formed of lithium niobate. Driving voltages of the first optical modulator 65, the second optical modulator 66, the third optical modulator 67, and the fourth optical modulator 68 are designed to be 1.5 V.

The first to fourth optical-modulator modulating units modulate the first to fourth optical modulators corresponding thereto, respectively, and change the intensities of lights emitted by the first and second light-emitting elements, whereby the electric signals as the result of the operations in the first and second operating blocks are converted into optical signals. This mechanism is briefly explained using a flow of a signal from the first operating block 47 to the first photodetecting element 73.

When the electric signal as the result of the operation in the first operating block 47 is transmitted to the first optical-modulator modulating unit 61, the NMOSFET of the first optical-modulator modulating unit 61 repeats ON and OFF. As a result, a voltage applied to the first optical modulator 65 changes. When light emitted by the first light-emitting element 59 always lit passes through the first optical modulator 65, according to the change in the voltage applied to the first optical modulator 65, the intensity of the light also changes and the intensity of the light received by the first photodetecting element 73 also changes. A level of the light changes to an optical signal and the electric signal is converted into an optical signal.

In the embodiment, in a state in which voltage are not applied to the first to fourth optical modulators, the intensities of lights propagating through the first to fourth optical waveguides decrease. In a state in which voltages are applied to the first to fourth optical modulators 4, the intensities of lights propagating through the first to fourth optical waveguides increase.

The first optical waveguide 69 connects the first light-emitting element 59 and the first photodetecting element 73 and transmits an optical signal generated by the first light-emitting element 59 to the first photodetecting element 73. More specifically, the first optical waveguide 69 has one end connected to the first light-emitting element 59 in common with the second optical waveguide 70. After branching from the second optical waveguide 70, the first optical waveguide 69 passes through the first optical modulator 65 and merges with the third optical waveguide 71. Then, the other end of the first optical waveguide 69 is connected to the first photodetecting element 73.

The second optical waveguide 70 connects the first light-emitting element 59 and the second photodetecting element 74 and transmits an optical signal generated by the first light-emitting element 59 to the second photodetecting element 74. More specifically, the second optical waveguide 70 has one end connected to the first light-emitting element 59 in common with the first optical waveguide 69. After branching from the first optical waveguide 69, the second optical waveguide 70 passes through the second optical modulator 66 and merges with the fourth optical waveguide 72. Then, the other end of the second optical waveguide 70 is connected to the second photodetecting element 74.

The third optical waveguide 71 connects the second light-emitting element 60 and the first photodetecting element 73 and transmits an optical signal generated by the second light-emitting element 60 to the first photodetecting element 73. More specifically, the third optical waveguide 71 has one end connected to the second light-emitting element 60 in common with the fourth optical waveguide 72. After branching from the fourth optical waveguide 72, the third optical waveguide 71 passes through the third optical modulator 67 and merges with the first optical waveguide 69. Then, the other end of the third optical waveguide 71 is connected to the first photodetecting element 73.

The fourth optical waveguide 72 connects the second light-emitting element 60 and the second photodetecting element 74 and transmits an optical signal generated by the second light-emitting element 60 to the second photodetecting element 74. More specifically, the fourth optical waveguide 72 has one end connected to the second light-emitting element 60 in common with the third optical waveguide 71. After branching from the third optical waveguide 71, the fourth optical waveguide 72 passes through the fourth optical modulator 68 and merges with the second optical waveguide 70. Then, the other end of the fourth optical waveguide 72 is connected to the second photodetecting element 74. The first optical waveguide 69, the second optical waveguide 70, the third optical waveguide 71, and the fourth optical waveguide 72 are formed of silicon (Si).

As described above, each of the optical waveguides branches from and merges with the other optical waveguides. Thus, a correspondence of inputs and outputs of the optical wiring unit 43 is in a two-to-two relation. It is possible to recombine data among the respective operating blocks of the main operating unit 45 to cause the main operating unit 45 to function as a multi-function circuit. A method of recombining data among the respective operating blocks is explained later together with explanation of a state control by the standby-mode control unit 46.

When light is received, the first photodetecting element 73 generates electricity corresponding to the intensity of the light. Therefore, the first photodetecting element 73 converts an optical signal transmitted through any one of the first optical waveguide 69 and the third optical waveguide 71 or both into an electric signal and transmits the electric signal to the third operating block 49. When light is received, the second photodetecting element 74 generates electricity corresponding to the intensity of the light. Therefore, the second photodetecting element 74 converts an optical signal transmitted through any one of the second optical waveguide 70 and the fourth optical waveguide 72 or both into an electric signal and transmits the electric signal to the fourth operating block 50. The first photodetecting element 73 and the second photodetecting element 74 include InGaAs photodiodes, respectively.

The sixth switch 75 is provided between the power supply unit 83 and the first light-emitting element 59 and switches the supply of electric power from the power supply unit 83 to the first light-emitting element 59 and the interruption of the electric power. The seventh switch 76 is provided between the power supply unit 83 and the second light-emitting element 60 and switches the supply of electric power from the power supply unit 83 to the second light-emitting element 60 and the interruption of the electric power.

The eighth switch 77 is provided between the power supply unit 84 and the first optical modulator 65 and switches the supply of electric power from the power supply unit 84 to the first optical modulator 65 and the interruption of the electric power. The ninth switch 78 is provided between the power supply unit 84 and the second optical modulator 66 and switches the supply of electric power from the power supply unit 84 to the second optical modulator 66 and the interruption of the electric power. The tenth switch 79 is provided between the power supply unit 84 and the third optical modulator 67 and switches the supply of electric power from the power supply unit 84 to the third optical modulator 67 and the interruption of the electric power. The eleventh switch 80 is provided between the power supply unit 84 and the fourth optical modulator 68 and switches the supply of electric power from the power supply unit 84 and the fourth optical modulator 68 and the interruption of the electric power.

Switching of ON and OFF of the sixth switch 75, the seventh switch 76, the eighth switch 77, the ninth switch 78, the tenth switch 79, and the eleventh switch 80 is performed according to an instruction from the standby-mode control unit 46. A method of switching the respective switches is explained later together with explanation of a state control by the standby-mode control unit 46.

The power supply unit 44 supplies electric power to the operating unit 42 and the optical wiring unit 43. The power supply unit 44 includes the power supply unit 81, the power supply unit 82, the power supply unit 83, the power supply unit 84, a (boot-up) sequencer 85, a first switching element 86, a second switching element 87, and a third switching element 88.

The power supply unit 81 supplies electric power to the main operating unit 45. The power supply unit 82 supplies electric power to the standby-mode control unit 46. The power supply unit 83 supplies electric power to the first light-emitting element 59 and the second light-emitting element 60 of the optical wiring unit 43. The power supply unit 84 supplies electric power to the first optical modulator 65, the second optical modulator 66, the third optical modulator 67, and the fourth optical modulator 68 of the optical wiring unit 43.

A power supply voltage required by the operating unit 42 (the main operating unit 45 and the standby-mode control unit 46) is 1.0 V. On the other hand, a power supply voltage required by the first light-emitting element 59 and the second light-emitting element 60 of the optical wiring unit 43 is 2.0 V as described above. A power supply voltage required by the first optical modulator 65, the second optical modulator 66, the third optical modulator 67, and the fourth optical modulator 68 of the optical wiring unit 43 is 1.5 V as described above. Therefore, the power supply unit 44 supplies these three different output voltages. These voltages are generated from a common input voltage by a so-called DC-DC converter.

During starting, the sequencer 85 functions as a boot-up sequencer and performs an initialization operation for a system. During reset from the standby mode, the sequencer 85 performs control of an order for resuming outputs of the respective units of the power supply unit 44.

The first switching element 86 switches the supply of electric power to the power supply unit 81 and the interruption of the electric power based on the standby signal (STB) and the standby mode release signal. The first switching element 86 is a control circuit in the power supply unit 44 and arranged on an input side of the power supply unit 81. The second switching element 87 switches the supply of electric power to the power supply unit 83 and the interruption of the electric power based on the standby signal (STB) and the standby mode release signal. The second switching element 87 is a control circuit in the power supply unit 44 and arranged on an input side of the power supply unit 83. The third switching element 88 switches the supply of electric power to the power supply unit 84 and the interruption of the electric power based on the standby signal (STB) and the standby mode release signal. The third switching element 88 is a control circuit in the power supply unit 44 and arranged on an input side of the power supply unit 84.

The first switching element 86, the second switching element 87, and the third switching element 88 can also be arranged on output sides of the power supply unit 81, the power supply unit 83, and the power supply unit 84, respectively. However, it is more desirable to arrange the first switching element 86, the second switching element 87, and the third switching element 88 on the input sides because it is possible to further reduce electric power consumed by the power supply unit 44 itself including the DC-DC converter.

The electric power consumed by the power supply unit 44 itself includes electric power necessary for processing for obtaining constant voltage. A value of the electric power depends not only on an actual output current but also on a maximum output current that can be output. Therefore, to reduce power consumption, it is effective to interrupt a power supply input to a power supply having a large maximum output current.

A mechanism of standby mode control by the standby-mode control unit 46 is explained in detail with reference to FIGS. 2A and 2B.

When the standby signal (STB) is received from the main operating unit 45 (time A in FIG. 2A), the standby-mode control unit 46 judges whether the optical-electrical hybrid integrated circuit 41 finally enters the standby mode. Even when the standby signal (STB) is received from the input/output unit (not shown), the standby-mode control unit 46 performs the same judgment.

When it is judged that the optical-electrical hybrid integrated circuit 41 enters the standby mode, the standby-mode control unit 46 transmits the standby signal (STB) to the power supply unit 44 (time B in FIG. 2A).

When the standby signal (STB) is received, the power supply unit 44 turns off the second switching element 87, the third switching element 88, and the first switching element 86 to thereby interrupt the supply of electric power to the power supply unit 83, the power supply unit 84, the power supply unit 81 (time C in FIG. 2A). Thereafter, the optical-electrical hybrid integrated circuit 41 operates in the standby mode. As a result, power consumption of the optical-electrical hybrid integrated circuit 41 is substantially reduced.

Even while the optical-electrical hybrid integrated circuit 41 is operating in the standby mode, electric power is continuously supplied to the standby-mode control unit 46 from the power supply unit 82. Thus, it is possible to perform control of the standby mode. For example, while the optical-electrical hybrid integrated circuit 41 is operating in the standby mode, when an inquiry signal about an operation state is input from the outside via the input/output unit (not shown), the standby-mode control unit 46 can perform control for returning a signal for informing that the optical-electrical hybrid integrated circuit 41 is in the standby mode.

While the optical-electrical hybrid integrated circuit 41 is operating in the standby mode, the standby-mode control unit 46 can always continuously transmit the signal for informing that the optical-electrical hybrid integrated circuit 41 is in the standby mode regardless of whether there is an inquiry from the outside. However, because the continuous transmission of the signal causes an increase in power consumption, it is desirable to adopt the form described above.

While the optical-electrical hybrid integrated circuit 41 is operating in the standby mode, when the standby mode release signal instructing release of the standby mode is received from the input/output unit (not shown) or the main operating unit 45 (time D in FIG. 2A), the standby-mode control unit 46 transmits the standby mode release signal to the power supply unit 44 (time E in FIG. 2A).

When the standby mode release signal is received, the power supply unit 44 turns on the second switching element 87, the third switching element 88, and the first switching element 86 based on the instruction of the sequencer 85 to thereby sequentially resume the supply of electric power to the power supply unit 83, the power supply unit 84, and the power supply unit 81 (time E in FIG. 2A). Consequently, the function of the main operating unit 45 employing the optical wiring unit 43 is enabled. In response to the resumption of the supply of electric power, the main operating unit 45 performs initialization processing such as confirmation of an internal memory state. Thus, it is possible to receive an instruction for signal processing from the input/output unit. In this way, the optical-electrical hybrid integrated circuit 41 operates in the normal state.

As described above, a normal operation state and an operation state in the standby mode are appropriately switched according to an operation processing state of the main operating unit. Consequently, the optical-electrical hybrid integrated circuit 41 can efficiently consume electric power while performing a normal operation processing. As a result, it is possible to substantially reduce power consumption.

In the embodiment, the standby-mode control unit 46 receives the standby signal (STB) from the main operating unit 45 with inverted logic. In other words, the standby-signal generating unit 57 generates the standby signal (STB) with inverted logic. This makes it possible to prevent a situation in which, when the optical-electrical hybrid integrated circuit 41 enters the standby mode and the supply of electric power to the main operating unit 45 is stopped, all signals output from the main operating unit 45 fall to 0 V and the standby signal (STB) from the main operating unit 45 is apparently inverted. A reason for this is explained using FIG. 2B.

FIG. 2B is a timing chart of standby mode control at the time when the standby-mode control unit 46 does not receive the standby signal (STB) from the main operating unit 45 with inverted logic. When the standby signal (STB) is received from the main operating unit 45 (time A in FIG. 2B) and the standby-mode control unit 46 judges that the optical-electrical hybrid integrated circuit 41 enters the standby mode, the standby-mode control unit 46 transmits the standby signal (STB) to the power supply unit 44 (time B in FIG. 2B). When the standby signal (STB) is received, the power supply unit 44 interrupts the supply of electric power to the power supply unit 83, the power supply unit 84, and the power supply unit

81 (time C in FIG. 2B). Thereafter, the optical-electrical hybrid integrated circuit 41 operates in the standby mode.

However, the main operating unit 45, the supply of electric power to which is interrupted, cannot maintain the standby signal (STB) and automatically outputs 0 V (an L level) (time C in FIG. 2B). Then, the standby-mode control unit 46 considers that the standby signal (STB) is inverted and outputs the standby mode release signal to the power supply unit 44 (time D in FIG. 2B). As a result, the power supply unit 83, the power supply unit 84, and the power supply unit 81 resume the supply of electric power. Simultaneously with the resumption of the supply of electric power, the main operating unit 45 outputs the standby signal (STB) again (the standby signal (STB) changes to an H level) (time E in FIG. 2B). Therefore, a state at time E is the same as a state at time A and the system automatically repeats the same operation (times E to H in FIG. 2B). As a result, the system falls into an oscillation state and cannot maintain the operation in the standby mode.

To prevent this problem, it is possible to design the arithmetic circuit of the standby-mode control unit 46 to use only a rising edge portion of the standby signal (STB) from the main operating unit 45 (when the optical-electrical hybrid integrated circuit 41 enters the standby state) and neglect a falling edge portion (when the optical-electrical hybrid integrated circuit 41 returns from the standby state). However, an area necessary for such an arithmetic circuit is by far the larger compared with an addition of only one NOT circuit in the case of the use of inverted logic.

By performing system design using inverted logic, it is possible to surely give, with simple circuit design, an instruction for the shift to the standby mode from the main operating unit 45 to the standby-mode control unit 46.

A mechanism of state control by the standby-mode control unit 46 is explained in detail using FIG. 5 again.

In the embodiment, a correspondence between inputs and outputs of the optical wiring unit 43 is a two-to-two relation (input units to the optical wiring unit 43 are the first operating block 47 and the second operating block 48 and output units from the optical wiring unit 43 is the third operating block 49 and the fourth operating block 50). The standby-mode control unit 46 has a function of controlling power supplying switches of the respective optical modulators of the optical wiring unit 43 based on a state signal from the main operating unit 45. Therefore, the standby-mode control unit 46 can recombine exchange of data among the respective operating blocks of the main operating unit 45 and cause the main operating unit 45 to function as a multi-function circuit. A method for this is explained below.

The standby-mode control unit 46 turns on and off, based on a state signal from the main operating unit 45, the eighth switch 77 for switching the supply of electric power to the first optical modulator 65 and the interruption of the electric power and the tenth switch 79 for switching the supply of electric power to the third optical modulator 67 and the interruption of the electric power and switches data input to the third operating block 49. When output data from the first operating block 47 is represented as A, output data from the second operating block 48 is represented as B, and input data to the third operating block 49 is represented as C, the following relation holds:

1. C=A+B (first optical modulator 65: ON, third optical modulator 67: ON);
2. C=A (first optical modulator 65: ON, third optical modulator 67: OFF);
3. C=B (first optical modulator 65: OFF, third optical modulator 67: ON); and
4. C=0 (first optical modulator 65: OFF, third optical modulator 67: OFF).

The standby-mode control unit 46 turns on and off, based on a state signal from the main operating unit 45, the ninth switch 78 for switching the supply of electric power to the second optical modulator 66 and the interruption of the electric power and the eleventh switch 80 for switching the supply of electric power to the fourth optical modulator 68 and the interruption of the electric power and switches data input to the fourth operating block 50. When an input of the fourth operating block 50 is represented as D, the following relation holds:

1. D=A+B (second optical modulator 66: ON, fourth optical modulator 68: ON);
2. D=A (second optical modulator 66: ON, fourth optical modulator 68: OFF);
3. D=B (second optical modulator 66: OFF, fourth optical modulator 68: ON); and
4. D=0 (second optical modulator 66: OFF, fourth optical modulator 68: OFF).

For example, when C=A and D=B are desired, the standby-mode control unit 46 receives a state signal indicating to that effect and turns on the eighth switch 77, turns off the ninth switch 78, turns off the tenth switch 79, and turns on the eleventh switch 80. When C=B and D=A are desired, the standby-mode control unit 46 receives a state signal indicating to that effect and turns off the eighth switch 77, turns on the ninth switch 78, turns on the tenth switch 79, and turns off the eleventh switch 80.

As described above, the standby-mode control unit 46 can control, based on a state signal from the main operating unit 45, the supply of electric power to the first optical modulator 65, the second optical modulator 66, the third optical modulator 67, and the fourth optical modulator 68 and appropriately switch data output from the optical wiring unit 43 (data input to the third operating block 49 and the fourth operating block 50). By performing such switching among a large number of blocks of the operating unit, it is possible to perform information processing while dynamically recombining functions of the circuits. Thus, it is possible to improve efficiency of the circuits.

Moreover, the standby-mode control unit 46 has a function of controlling, based on a state signal from the main operating unit 45, the power supplying switches of the respective operating blocks of the main operating unit 45 and the power supplying switches of the respective light-emitting elements of the optical wiring unit 43. Therefore, the standby-mode control unit 46 can stop the supply of electric power to sections temporarily made unnecessary by the recombination of the circuit functions. A method for this is explained below.

The standby-mode control unit 46 turns on and off, based on a state signal from the main operating unit 45, the first switch 52 for switching the supply of electric power to the first operating block 47 and the interruption of the electric power, the second switch 53 for switching the supply of electric power to the second operating block 48 and the interruption of the electric power, the third switch 54 for switching the supply of electric power to the third operating block 49 and the interruption of the electric power, the fourth switch 55 for switching the supply of electric power to the fourth operating block 50 and the interruption of the electric power, the sixth switch 75 for switching the supply of electric power to the first light-emitting element 59 and the interruption of the electric power, and the seventh switch 76 for switching the supply of electric power to the second light-emitting element 60 and the interruption of the electric power.

For example, when C=0 and D=B, the first optical modulator 65, the second optical modulator 66, and the third optical modulator 67 are off and only the fourth optical modulator 68 is on. In such a case, it is possible to turn off the first light-emitting element 59 to which data is not input. It is possible to turn off the first operating block 47 that does not output data, i.e., does not perform the operation processing and the third operating block 49 to which data is not input, i.e., which is not planned to perform the operation processing.

Therefore, the standby-mode control unit 46 receives a state signal indicating to that effect and turns off the sixth switch 75, the first switch 52, and the third switch 54. By performing such switching of the switches, the optical-electrical hybrid integrated circuit 41 can efficiently consume electric power without spoiling the arithmetic function of the circuits. As a result, it is possible to substantially reduce power consumption.

As described above, in the optical-electrical hybrid integrated circuit according to the third embodiment, it is possible to substantially reduce power consumption while guaranteeing normal operations of the circuits by providing the standby mode in which the supply of electric power to the optical wiring unit having the light-emitting element with large power consumption and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

Moreover, in the optical-electrical hybrid integrated circuit according to the third embodiment, it is possible to substantially reduce power consumption while guaranteeing normal operations of the circuits by appropriately performing the start and the interruption of the electric power of electric power to the respective sections of the optical wiring unit and the respective sections of the main operating unit. As a result, in an optical-electrical hybrid integrated circuit mounted on an apparatus represented by a portable apparatus in which a reduction of power consumption by the stop of power consuming sections that do not need to be operated is important, it is possible to enjoy the advantage of the optical wiring.

A fourth embodiment of the present invention is different from the first and second embodiments in that a correspondence between inputs and outputs of an optical wiring unit is represented as a two-to-two relation instead of a one-to-one relation and a standby-mode control unit has a function of controlling not only a power supply unit but also power supplying switches of respective units of a main operating unit and the optical wiring unit. Moreover, in the third embodiment, the light-emitting elements and the operating blocks that output electric signals to the optical wiring correspond to each other in a one-to-one relation. However, in the fourth embodiment, light-emitting elements and operating blocks to which electric signals from an optical wiring are input correspond to each other in a one-to-one relation.

Concerning the structure of an optical-electrical hybrid integrated circuit according to the fourth embodiment, components different from the third embodiment are explained. Because the other components are the same as those in the third embodiment, the components are denoted by the same reference numerals and signs and explanation of the components is omitted.

Figure 6:
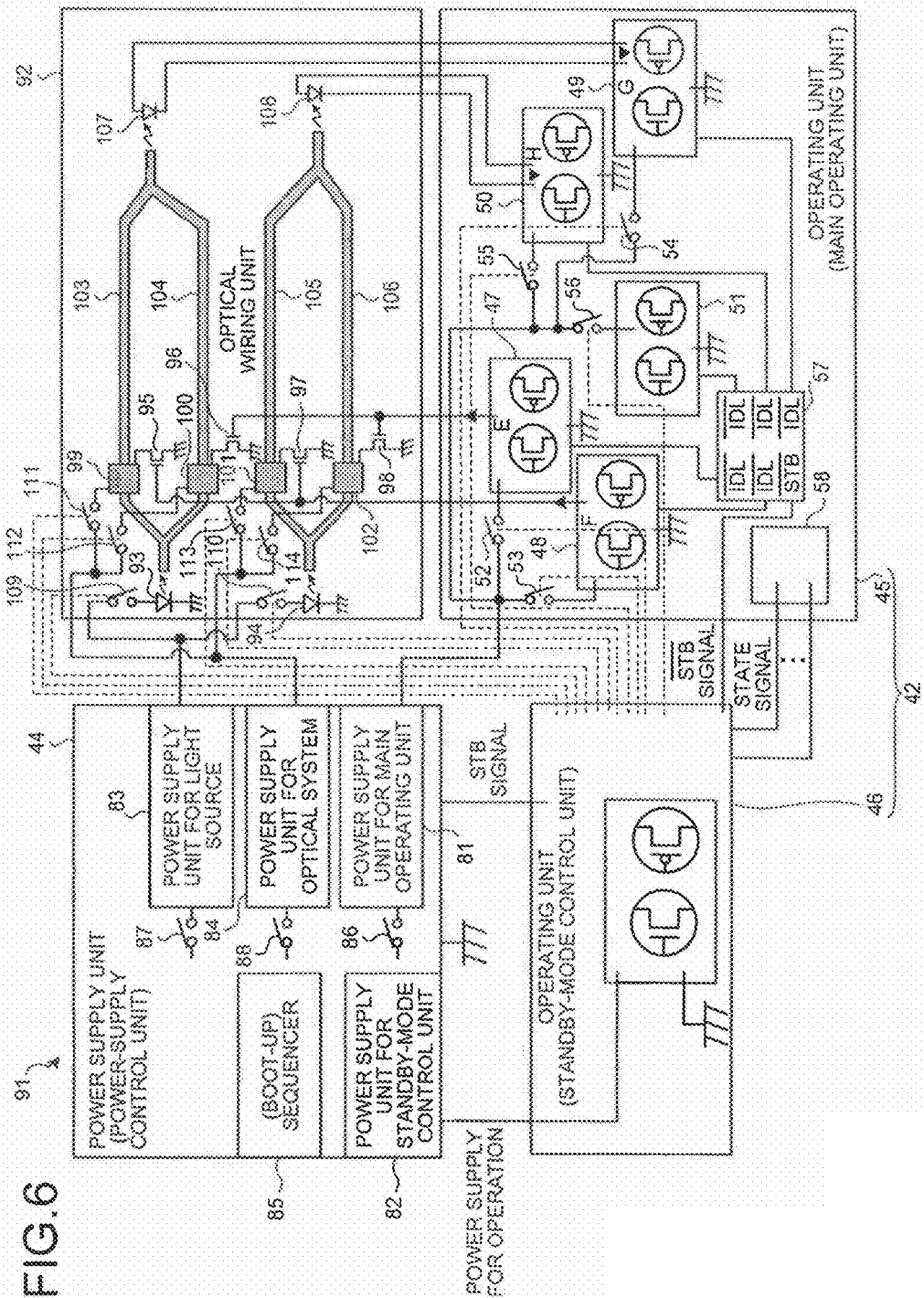
FIG. 6 is a schematic diagram of the structure of an optical-electrical hybrid integrated circuit according to a fourth embodiment of the present invention.

FIG. 6 is a schematic diagram of a state of connection of main components. An optical-electrical hybrid integrated circuit 91 according to the embodiment includes the operating unit 42, an optical wiring unit 92, and the power supply unit 44.

The operating unit 42 includes the main operating unit 45 and the standby-mode control unit 46. The main operating unit 45 includes the first operating block 47, the second operating block 48, the third operating block 49, the fourth operating block 50, and the fifth operating block 51 that individually perform an operation processing, the first switch 52, the second switch 53, the third switch 54, the fourth switch 55, and the fifth switch 56, the standby-signal generating unit 57, and the state-signal generating unit 58. Standby mode control of the standby-mode control unit 46 is the same as that in the third embodiment. Thus, explanation of the standby mode control is omitted. A state control function of the standby-mode control unit 46 is explained in detail later.

The standby-signal generating unit 57 generates a standby signal (STB) for instructing entrance into a standby mode (a standby state). The standby mode indicates a state in which the optical wiring unit 92 and the main operating unit 45 are stopped and only the standby-mode control unit 46 is operating, i.e., the power supply unit 83, the power supply unit 84, and the power supply unit 81 are stopped and only the power supply unit 82 is operating. Therefore, in the standby mode, power consumption is substantially reduced.

The optical wiring unit 92 is connected to the first operating block 47, the second operating block 48, the third operating block 49, and the fourth operating block 50 arranged in the main operating unit 45. The optical wiring unit 92 converts electric signals as result of the operations in any one of the first operating block 47 and the second operating block 48 or both into optical signals. The optical wiring unit 92 directly transmits the optical signal as the result of the operation in the first operating block 47 and the optical signal as the result of the operation in the second operating block 48. Alternatively, the optical wiring unit 92 converts optical signals as OR signals of the result of the operation in the first operating block 47 and the result of the operation in the second operating block 48 into electric signals and transmits the electric signals to any one of the third operating block 49 and the fourth operating block 50 or both.

The optical wiring unit 92 includes a first light-emitting element 93, a second light-emitting element 94, a first optical-modulator modulating unit 95, a second optical-modulator modulating unit 96, a third optical-modulator modulating unit 97, a fourth optical-modulator modulating unit 98, a first optical modulator 99, a second optical modulator 100, a third optical modulator 101, a fourth optical modulator 102, a first optical waveguide 103, a second optical waveguide 104, a third optical waveguide 105, a fourth optical waveguide 106, a first photodetecting element 107, a second photodetecting element 108, a sixth switch 109, a seventh switch 110, an eighth switch 111, a ninth switch 112, a tenth switch 113, and an eleventh switch 114.

The first light-emitting element 93 and the second light-emitting element 94 emit light. The first light-emitting element 93 and the second light-emitting element 94 include GaInNAs semiconductor lasers, respectively. In the embodiment, the first light-emitting element 93 and the second light-emitting element 94 are always in a lit state when the optical wiring is used. As described later, the first optical waveguide 103, the second optical waveguide 104, the third optical waveguide 105, and the fourth optical waveguide 106 have branches. Thus, rated currents of the first light-emitting element 93 and the second light-emitting element 94 are 1.0 mA larger than those in the first and second embodiments and a necessary power supply voltage is 2.0 V. Therefore, power consumptions during lighting of the first light-emitting element 93 and the second light-emitting element 94 are 2.0 mW. The power consumptions are by far the larger compared with power consumption in a standby state of the operating unit 42.

The first optical-modulator modulating unit 95 modulates the first optical modulator 99 according to the electric signal as the result of the operation in the second operating block 48. The second optical-modulator modulating unit 96 modulates the second optical modulator 100 according to the electric signal as the result of the operation in the first operating block 47. The third optical-modulator modulating unit 97 modulates the third optical modulator 101 according to the electric signal as the result of the operation in the second operating block 48. The fourth optical-modulator modulating unit 98 modulates the fourth optical modulator 102 according to the electric signal as the result of the operation in the first operating block 47. The first optical-modulator modulating unit 95, the second optical-modulator modulating unit 96, the third optical-modulator modulating unit 97, and the fourth optical-modulator modulating unit 98 include NMOSFETs, respectively.

The first optical modulator 99 changes the intensity of light propagating through the first optical waveguide 103 and converts the electric signal as the result of the operation in the second operating block 48 into an optical signal. The second optical modulator 100 changes the intensity of light propagating through the second optical waveguide 104 and converts the electric signal as the result of the operation in the first operating block 47 into an optical signal. The third optical modulator 101 changes the intensity of light propagating through the third optical waveguide 105 and converts the electric signal as the result of the operation in the second operating block 48 into an optical signal. The fourth optical modulator 102 changes the intensity of light propagating through the fourth optical waveguide 106 and converts the electric signal as the result of the operation in the first operating block 47 into an optical signal.

The first optical modulator 99, the second optical modulator 100, the third optical modulator 101, and the fourth optical modulator 102 are formed of lithium niobate. Driving voltages of the first optical modulator 99, the second optical modulator 100, the third optical modulator 101, and the fourth optical modulator 102 are designed to be 1.5 V.

The first to fourth optical-modulator modulating units modulate the first to fourth optical modulators corresponding thereto, respectively, and change the intensities of lights emitted by the first and second light-emitting elements, whereby the electric signals as the result of the operations in the first and second operating blocks are converted into optical signals. This mechanism is the same as that in the third embodiment. Thus, explanation of the mechanism is omitted.

The first optical waveguide 103 connects the first light-emitting element 93 and the first photodetecting element 107 and transmits an optical signal generated by the first light-emitting element 93 to the first photodetecting element 107. More specifically, the first optical waveguide 103 has one end connected to the first light-emitting element 93 in common with the second optical waveguide 104. After branching from the second optical waveguide 104, the first optical waveguide 103 passes through the first optical modulator 99 and merges with the second optical waveguide 104. Then, the other end of the first optical waveguide 103 is connected to the first photodetecting element 107.

The second optical waveguide 104 connects the first light-emitting element 93 and the first photodetecting element 107 and transmits an optical signal generated by the first light-emitting element 93 to the first photodetecting element 107. More specifically, the second optical waveguide 104 has one end connected to the first light-emitting element 93 in common with the first optical waveguide 103. After branching from the first optical waveguide 103, the second optical waveguide 104 passes through the second optical modulator 100 and merges with the first optical waveguide 103. Then, the other end of the second optical waveguide 104 is connected to the first photodetecting element 107.

The third optical waveguide 105 connects the second light-emitting element 94 and the second photodetecting element 108 and transmits an optical signal generated by the second light-emitting element 94 to the second photodetecting element 108. More specifically, the third optical waveguide 105 has one end connected to the second light-emitting element 94 in common with the fourth optical waveguide 106. After branching from the fourth optical waveguide 106, the third optical waveguide 105 passes through the third optical modulator 101 and merges with the fourth optical waveguide 106. Then, the other end of the third optical waveguide 105 is connected to the second photodetecting element 108.

The fourth optical waveguide 106 connects the second light-emitting element 94 and the second photodetecting element 108 and transmits an optical signal generated by the second light-emitting element 94 to the second photodetecting element 108. More specifically, the fourth optical waveguide 106 has one end connected to the second light-emitting element 94 in common with the third optical waveguide 105. After branching from the third optical waveguide 105, the fourth optical waveguide 106 passes through the fourth optical modulator 102 and merges with the third optical waveguide 105. Then, the other end of the fourth optical waveguide 106 is connected to the second photodetecting element 108. The first optical waveguide 103, the second optical waveguide 104, the third optical waveguide 105, and the fourth optical waveguide 106 are formed of silicon (Si).

As described above, each of the optical waveguides branches from and merges with the other optical waveguides. Thus, a correspondence of inputs and outputs of the optical wiring unit 92 is in a two-to-two relation. It is possible to recombine data among the respective operating blocks of the main operating unit 45 to cause the main operating unit 45 to function as a multi-function circuit. A method of recombining data among the respective operating blocks is explained later together with explanation of a state control by the standby-mode control unit 46.

When light is received, the first photodetecting element 107 generates electricity corresponding to the intensity of the light. Therefore, the first photodetecting element 107 converts an optical signal transmitted through any one of the first optical waveguide 103 and the second optical waveguide 104 or both into an electric signal and transmits the electric signal to the third operating block 49. When light is received, the second photodetecting element 108 generates electricity corresponding to the intensity of the light. Therefore, the second photodetecting element 108 converts an optical signal transmitted through any one of the third optical waveguide 105 and the fourth optical waveguide 106 or both into an electric signal and transmits the electric signal to the fourth operating block 50. The first photodetecting element 107 and the second photodetecting element 108 include InGaAs photodiodes, respectively.

The sixth switch 109 is provided between the power supply unit 83 and the first light-emitting element 93 and switches the supply of electric power from the power supply unit 83 to the first light-emitting element 93 and the interruption of the electric power. The seventh switch 110 is provided between the power supply unit 83 and the second light-emitting element 94 and switches the supply of electric power from the power supply unit 83 to the second light-emitting element 94 and the interruption of the electric power.

The eighth switch 111 is provided between the power supply unit 84 and the first optical modulator 99 and switches the supply of electric power from the power supply unit 84 to the first optical modulator 99 and the interruption of the electric power. The ninth switch 112 is provided between the power supply unit 84 and the second optical modulator 100 and switches the supply of electric power from the power supply unit 84 to the second optical modulator 100 and the interruption of the electric power. The tenth switch 113 is provided between the power supply unit 84 and the third optical modulator 101 and switches the supply of electric power from the power supply unit 84 to the third optical modulator 101 and the interruption of the electric power. The eleventh switch 114 is provided between the power supply unit 84 and the fourth optical modulator 102 and switches the supply of electric power from the power supply unit 84 and the fourth optical modulator 102 and the interruption of the electric power.

Switching of ON and OFF of the sixth switch 109, the seventh switch 110, the eighth switch 111, the ninth switch 112, the tenth switch 113, and the eleventh switch 114 is performed according to an instruction from the standby-mode control unit 46. A method of switching the respective switches is explained later together with explanation of state control by the standby-mode control unit 46.

The power supply unit 44 includes the power supply unit 81, the power supply unit 82, the power supply unit 83, the power supply unit 84, the sequencer 85, the first switching element 86, the second switching element 87, and the third switching element 88.

A mechanism of state control by the standby-mode control unit 46 is explained in detail below.

In the embodiment, a correspondence between inputs and outputs of the optical wiring unit 92 is a two-to-two relation (input units to the optical wiring unit 92 are the first operating block 47 and the second operating block 48 and output units from the optical wiring unit 92 is the third operating block 49 and the fourth operating block 50). The standby-mode control unit 46 has a function of controlling power supplying switches of the respective optical modulators of the optical wiring unit 92 based on a state signal from the main operating unit 45. Therefore, the standby-mode control unit 46 can recombine exchange of data among the respective operating blocks of the main operating unit 45 and cause the main operating unit 45 to function as a multi-function circuit. A method for this is explained below.

The standby-mode control unit 46 turns on and off, based on a state signal from the main operating unit 45, the eighth switch 111 for switching the supply of electric power to the first optical modulator 99 and the interruption of the electric power and the ninth switch 112 for switching the supply of electric power to the second optical modulator 100 and the interruption of the electric power and switches data input to the third operating block 49. When output data from the first operating block 47 is represented as E, output data from the second operating block 48 is represented as F, and input data to the third operating block 49 is represented as G, the following relation holds:

1. G=E+F (first optical modulator 99: ON, second optical modulator 100: ON);
2. G=E (first optical modulator 99: OFF, second optical modulator 100: ON);
3. G=F (first optical modulator 99: ON, second optical modulator 100: OFF); and
4. G=0 (first optical modulator 99: OFF, second optical modulator 100: OFF).

The standby-mode control unit 46 turns on and off, based on a state signal from the main operating unit 45, the tenth switch 113 for switching the supply of electric power to the third optical modulator 101 and the interruption of the electric power and the eleventh switch 114 for switching the supply of electric power to the fourth optical modulator 102 and the interruption of the electric power and switches data input to the fourth operating block 50. When an input of the fourth operating block 50 is represented as H, the following relation holds:

1. H=E+F (third optical modulator 101: ON, fourth optical modulator 102: ON);
2. H=E (third optical modulator 101: OFF, fourth optical modulator 102: ON);
3. H=F (third optical modulator 101: ON, fourth optical modulator 102: OFF); and
4. H=0 (third optical modulator 101: OFF, fourth optical modulator 102: OFF).

For example, when G=E and H=F are desired, the standby-mode control unit 46 receives a state signal indicating to that effect and turns off the eighth switch 111, turns on the ninth switch 112, turns on the tenth switch 113, and turns off the eleventh switch 114. When G=F and H=E are desired, the standby-mode control unit 46 receives a state signal indicating to that effect and turns on the eighth switch 111, turns off the ninth switch 112, turns off the tenth switch 113, and turns on the eleventh switch 114.

As described above, the standby-mode control unit 46 can control, based on a state signal from the main operating unit 45, the supply of electric power to the first optical modulator 99, the second optical modulator 100, the third optical modulator 101, and the fourth optical modulator 102 and appropriately switch data output from the optical wiring unit 92 (data input to the third operating block 49 and the fourth operating block 50). By performing such switching among a large number of blocks of the operating unit, it is possible to perform information processing while dynamically recombining functions of the circuits. Thus, it is possible to improve efficiency of the circuits.

Moreover, the standby-mode control unit 46 has a function of controlling, based on a state signal from the main operating unit 45, the power supplying switches of the respective operating blocks of the main operating unit 45 and the power supplying switches of the respective light-emitting elements of the optical wiring unit 92. Therefore, the standby-mode control unit 46 can stop the supply of electric power to sections temporarily made unnecessary by the recombination of the circuit functions. A method for this is explained below.

The standby-mode control unit 46 turns on and off, based on a state signal from the main operating unit 45, the first switch 52 for switching the supply of electric power to the first operating block 47 and the interruption of the electric power, the second switch 53 for switching the supply of electric power to the second operating block 48 and the interruption of the electric power, the third switch 54 for switching the supply of electric power to the third operating block 49 and the interruption of the electric power, the fourth switch 55 for switching the supply of electric power to the fourth operating block 50 and the interruption of the electric power, the sixth switch 109 for switching the supply of electric power to the first light-emitting element 93 and the interruption of the electric power, and the seventh switch 110 for switching the supply of electric power to the second light-emitting element 94 and the interruption of the electric power.

For example, when G=0 and H=E, the first optical modulator 99, the second optical modulator 100, and the third optical modulator 101 are off and only the fourth optical modulator 102 is on. In such a case, it is possible to turn off the first light-emitting element 93 to which data is not input. It is possible to turn off the second operating block 48 that does not output data, i.e., does not perform the operation processing and the third operating block 49 to which data is not input, i.e., which is not planned to perform the operation processing.

Therefore, the standby-mode control unit 46 receives a state signal indicating to that effect and turns off the sixth switch 109, the second switch 53, and the third switch 54. By performing such switching of the switches, the optical-electrical hybrid integrated circuit 91 can efficiently consume electric power without spoiling the arithmetic function of the circuits. As a result, it is possible to substantially reduce power consumption.

The third embodiment has a characteristic that, since the light-emitting elements and the operating blocks that perform output to the optical wiring correspond to each other in a one-to-one relation, conditions with which the supply of electric power to the light-emitting elements can be turned off are determined by the functions of the operating blocks on a pre-stage side. The forth embodiment has a characteristic that, since the light-emitting elements and the function blocks to which data is input from the optical wiring correspond to each other in a one-to-one relation, conditions with which the supply of electric power to the light-emitting elements can be turned off are determined by the functions of operating blocks on a post-stage side. Decision on which of the methods is desirable depends on characteristics of the respective function blocks. Thus, it is possible to appropriately select the method according to a circuit configuration.

As described above, in the optical-electrical hybrid integrated circuit according to the fourth embodiment, it is possible to substantially reduce power consumption while guaranteeing normal operations of the circuits by providing the standby mode in which the supply of electric power to the optical wiring unit having the light-emitting element with large power consumption and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

Moreover, in the optical-electrical hybrid integrated circuit according to the fourth embodiment, it is possible to substantially reduce power consumption while guaranteeing normal operations of the circuits by appropriately performing the start and the interruption of the supply of electric power to the respective sections of the optical wiring unit and the respective sections of the main operating unit. As a result, in an optical-electrical hybrid integrated circuit mounted on an apparatus represented by a portable apparatus in which a reduction of power consumption by the stop of power consuming sections that do not need to be operated is important, it is possible to enjoy the advantage of the optical wiring.

A fifth embodiment according to the present invention is different from the first and second embodiment in that a temperature compensating unit is provided in an optical wiring unit.

Figure 7:
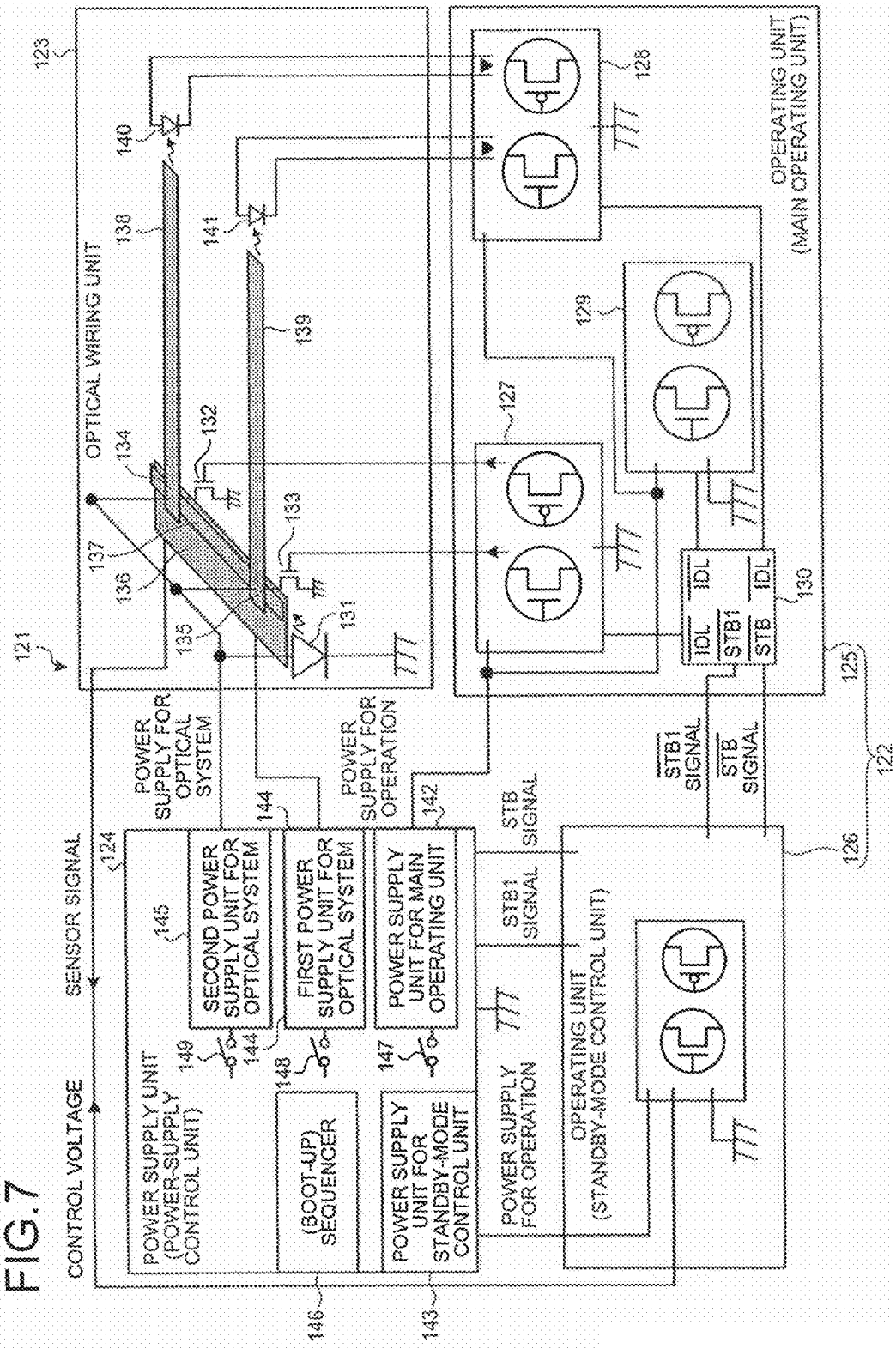
FIG. 7 is a schematic diagram of the structure of an optical-electrical hybrid integrated circuit according to a fifth embodiment of the present invention.

FIG. 7 is a schematic diagram of a state of connection of main components. An optical-electrical hybrid integrated circuit 121 according to the embodiment includes an operating unit 122, an optical wiring unit 123, and a power supply unit (a power-supply control unit) 124.

The operating unit 122 performs an operation processing and includes a main operating unit 125 and a standby-mode control unit 126. The main operating unit 125 includes a normal CMOS circuit, performs an actual operation processing that the optical-electrical hybrid integrated circuit 121 is required to perform, transmits a signal instructing entrance into a standby 1 state (STB1) or a standby signal (STB) to the standby-mode control unit 126, and exchanges information with the outside via a input/output unit (not shown).

The main operating unit 125 includes a first operating block 127, a second operating block 128, and a third operating block 129 that individually perform an operation processing and a standby-signal generating unit 130. The first operating block 127 and the second operating block 128 are connected via the optical wiring unit 123. A result of the operation calculated by the first operating block 127 is transmitted to the second operating block 128 through the optical wiring unit 123. The third operating block 129 is not directly connected to the optical wiring unit 123 and only includes electric wirings.

The standby-signal generating unit 130 generates a signal instructing entrance into the standby 1 state (STB1) and a standby signal (STB) for instructing entrance into a standby mode (a standby state). The standby 1 state indicates a state in which sections other than a temperature compensating unit 136 of the optical wiring unit 123 and the main operating unit 125 are stopped and the temperature compensating unit 136 of the optical wiring unit 123 and the standby-mode control unit 126 are operating, i.e., a second power supply unit for optical system 145 and a power supply unit for main operating unit 142 are turned off and a first power supply unit for optical system 144 and a power supply unit for standby-mode control unit 143 are operating. Therefore, in the standby 1 state, power consumption is substantially reduced.

The standby mode indicates a state in which the optical wiring unit 123 and the main operating unit 125 are stopped and only the standby-mode control unit 126 is operating, i.e., the first power supply unit 144, the second power supply unit 145, and the power supply unit 142 are stopped and only the power supply unit 143 is operating. Therefore, in the standby mode, power consumption is further reduced compared with the standby 1 state.

The signal instructing entrance into the standby 1 state (STB1) is generated when all operating blocks in the main operating unit 125 suspend the operation processing. Specifically, the standby-signal generating unit 130 receives, with inverted logic, a signal (IDL) indicating that the first operating block 127, the second operating block 128, and the third operating block 129 in the main operating unit 125 practically suspend the operation processing from the respective operating blocks and performs an OR operation processing to thereby generate the standby signal instructing entrance into the standby 1 state (STB1).

The standby signal (STB) is generated when time of the standby 1 state exceeds a predetermined set value. The standby-signal generating unit 130 generates, with inverted logic, the signal instructing entrance into the standby 1 state (STB1) and the standby signal (STB). A reason for this is explained in detail later.

The standby-mode control unit 126 controls the standby 1 state and the standby mode in the optical-electrical hybrid integrated circuit 121. Specifically, the standby-mode control unit 126 transmits the signal instructing entrance into the standby 1 state (STB1) and a standby 1 state release signal to the power supply unit 124 to thereby control ON and OFF of the second power supply unit 145 and the power supply unit 142, i.e., the supply of electric power to the sections other than the temperature compensating unit 136 of the optical wiring unit 123 and the main operating unit 125.

More specifically, the standby-mode control unit 126 transmits the standby signal (STB) or the standby mode release signal to the power supply unit 124 to thereby control OFF of the first power supply unit for optical system 144 and ON of the first power supply unit for optical system 144, the second power supply unit for optical system 145, and the power supply unit for main operating unit 142, i.e., the supply of electric power to the optical wiring unit 123 and the main operating unit 125.

The standby-mode control unit 126 includes a normal CMOS circuit and is not directly connected to the optical wiring. The standby-mode control unit 126 includes only electric wirings. Therefore, even in a state in which a light-emitting element 131 of the optical wiring unit 123 is stopped, it is possible to keep functions of the standby-mode control unit 126. Functions of the standby-mode control unit 126 are explained in detail later.

The optical wiring unit 123 is connected to the first operating block 127 and the second operating block 128 arranged in the main operating unit 125. The optical wiring unit 123 converts an electric signal as a result of the operation in the first operating block 127 into an optical signal, transmits the optical signal, then, converts the optical signal into the electric signal, and transmits the electric signal to the second operating block 128. The optical wiring unit 123 includes the light-emitting element 131, a first applied-voltage changing unit 132, a second applied-voltage changing unit 133, a first optical demultiplexer 134, a second optical demultiplexer 135, the temperature compensating unit 136, a first optical waveguide 137, a second optical waveguide 138, a third optical waveguide 139, a first photodetecting element 140, and a second photodetecting element 141.

The light-emitting element 131 emits light. The light-emitting element 131 includes a GaInNAs semiconductor laser. In the embodiment, the light-emitting element 131 is always in a lit state when the optical wiring is used. As described later, the first optical waveguide 137, the second optical waveguide 138, and the third optical waveguide 139 have branches. Thus, a rated current of the light-emitting element 131 is 1.0 mA larger than those in the first and second embodiments and a necessary power supply voltage is 2.0 V. Therefore, power consumption during lighting of the light-emitting element 131 is 2.0 mW. The power consumptions are by far the larger compared with power consumption in a standby state of the operating unit 122.

The first applied-voltage changing unit 132 applies a voltage to the first optical demultiplexer 134 based on the electric signal as the result of the operation in the first operating block 127. The second applied-voltage changing unit 133 applies a voltage to the second optical demultiplexer 135 based on the electric signal as the result of the operation in the first operating block 127. The first applied-voltage changing unit 132 and the second applied-voltage changing unit 133 include NMOSFETs, respectively.

The first optical demultiplexer 134 demultiplexes light from the first optical waveguide 137, transmits the light to the second optical waveguide 138, changes the intensity of the light propagating through the second optical waveguide 138, and converts the electric signal as the result of the operation in the first operating block 127 into an optical signal. The second optical demultiplexer 135 demultiplexes light from the first optical waveguide 137, transmits the light to the third optical waveguide 139, changes the intensity of the light propagating through the third optical waveguide 139, and converts the electric signal as the result of the operation in the first operating block 127 to an optical signal.

The first optical demultiplexer 134 and the second optical demultiplexer 135 are a resonator type and are formed of GaInAsP. Driving voltages of the first optical demultiplexer 134 and the second optical demultiplexer 135 are designed to be 2.0 V. In general, a demultiplexer of a resonator type depends on an operating temperature and a resonant characteristic of the demultiplexer changes because of thermal expansion. Thus, it is necessary to perform temperature compensation. Therefore, in the embodiment, the temperature compensating unit 136 is provided.

The first applied-voltage changing unit 132 and the second applied-voltage changing unit 133 apply voltages to the first optical demultiplexer 134 and the second optical demultiplexer 135 corresponding thereto, respectively. The first optical demultiplexer 134 and the second optical demultiplexer 135 change the intensities of lights emitted by the light-emitting element 131. Consequently, the electric signal as the result of the operation in the first operating block 127 is converted into an optical signal. This mechanism is briefly explained using a flow of a signal from the first operating block 127 to the first photodetecting element 140.

When the electric signal as the result of the operation in the first operating block 127 is transmitted to the first applied-voltage changing unit 132, the NMOSFET of the first applied-voltage changing unit 132 repeats ON an OFF. As a result, a voltage applied to the first optical demultiplexer 134 changes. When light emitted by the light-emitting element 131 always lit passes through the first optical demultiplexer 134, according to the change in the voltage applied to the first optical demultiplexer 134, the intensity of the light branched to the second optical waveguide 138 also changes and the intensity of the light received by the first photodetecting element 140 also changes. A level of the light changes to an optical signal and the electric signal is converted into the optical signal.

In the embodiment, in a state in which voltages are not applied to the first optical demultiplexer 134 and the second optical demultiplexer 135, the intensity of light propagating through the second optical waveguide 138 and the third optical waveguide 139 decreases. In a state in which voltages are applied to the first optical demultiplexer 134 and the second optical demultiplexer 135, the intensity of light propagating through the second optical waveguide 138 and the third optical waveguide 139 increases.

The temperature compensating unit 136 performs temperature compensation for the first optical demultiplexer 134 and the second optical demultiplexer 135. In general, a demultiplexer of a resonator type depends on an operating temperature and a resonant characteristic of the demultiplexer changes because of thermal expansion. Thus, it is necessary to perform temperature compensation. The temperature compensating unit 136 includes a temperature sensor. A signal of the temperature sensor is transmitted to the standby-mode control unit 126. The standby-mode control unit 126 processes the signal from the temperature sensor, calculates a desired control voltage, and transmits a voltage generated by digital-to-analog (DA) conversion to the temperature compensating unit 136. The temperature compensating unit 136 applies the received control voltage to a piezo element of lead zirconate titanate (PZT) built therein and expands or contracts the first optical demultiplexer 134 and the second optical demultiplexer 135 in a direction for canceling the influence of thermal expansion.

Consequently, even when operating temperatures of the first optical demultiplexer 134 and the second optical demultiplexer 135 change and expansion or contraction thereof occurs because of thermal expansion, the expansion or contraction is compensated by the expansion or contraction of the piezo element. Thus, compensation concerning temperature is possible. When an area in which the first optical demultiplexer 134 and the second optical demultiplexer 135 is large, it is possible to divide the area into a plurality of areas, provide temperature sensors in the respective areas, and control a voltage applied to the piezo element for each of the areas. A driving voltage of the temperature compensating unit 136 is 3.0 V.

The first optical waveguide 137 connects the light-emitting element 131 and the first optical demultiplexer 134 and the second optical demultiplexer 135 and transmits an optical signal generated by the light-emitting element 131 to the first optical demultiplexer 134 and the second optical demultiplexer 135. The second optical waveguide 138 connects the first optical demultiplexer 134 and the first photodetecting element 140 and transmits the optical signal, the intensity of which is changed by the first optical demultiplexer 134, to the first photodetecting element 140. The third optical waveguide 139 connects the second optical demultiplexer 135 and the second photodetecting element 141 and transmits the optical signal, the intensity of which is changed by the second optical demultiplexer 135, to the second photodetecting element 141. With such a structure, the optical signal transmitted through the first optical waveguide 137 branches to the second optical waveguide 138 and the third optical waveguide 139. The first optical waveguide 137, the second optical waveguide 138, and the third optical waveguide 139 are formed of silicon (Si).

When light is received, the first photodetecting element 140 generates electricity corresponding to the intensity of the light. Therefore, the first photodetecting element 140 converts the optical signal transmitted through the second optical waveguide 138 into an electric signal and transmits the electric signal to the second operating block 128. When light is received, the second photodetecting element 141 generates electricity corresponding to the intensity of the light. Therefore, the second photodetecting element 141 converts the optical signal transmitted through the third optical waveguide 139 into an electric signal and transmits the electric signal to the second operating block 128. The first photodetecting element 140 and the second photodetecting element 141 include InGaAs photodiodes, respectively.

The power supply unit 124 supplies electric power to the operating unit 122 and the optical wiring unit 123. The power supply unit 124 includes the power supply unit 142, the power supply unit 143, the first power supply unit 144, the second power supply unit 145, a (boot-up) sequencer 146, a first switching element 147, a second switching element 148, and a third switching element 149.

The power supply unit 142 supplies electric power to the main operating unit 125. The power supply unit 143 supplies electric power to the standby-mode control unit 126. The first power supply unit 144 supplies electric power to the temperature compensating unit 136 of the optical wiring unit 123. The second power supply unit 145 supplies electric power to the light-emitting element 131, the first optical demultiplexer 134, and the second optical demultiplexer 135 of the optical wiring unit 123.

A power supply voltage required by the operating unit 122 (the main operating unit 125 and the standby-mode control unit 126) is 1.0 V. On the other hand, a power supply voltage required by the light-emitting element 131, the first optical demultiplexer 134, and the second optical demultiplexer 135 of the optical wiring unit 123 is 2.0 V as described above. A power supply voltage required by the temperature compensating unit 136 of the optical wiring unit 123 is 3.0 V as described above. Therefore, the power supply unit 124 supplies the three different output voltages. These voltages are generated from a common input voltage by a so-called DC-DC converter.

During starting, the sequencer 146 functions as a boot-up sequencer and performs an initialization operation for a system. During reset from the standby 1 state and the standby mode, the sequencer 146 performs control of an order for resuming outputs of the respective units of the power supply unit 124.

The first switching element 147 switches the supply of electric power to the power supply unit 142 and the interruption of the electric power based on the standby signal (STB), the standby mode release signal, the signal instructing entrance into the standby 1 state (STB1), and the standby 1 state release signal. The first switching element 147 is a control circuit in the power supply unit 124 and arranged on an input side of the power supply unit 142. The second switching element 148 switches the supply of electric power to the first power supply unit 144 and the interruption of the electric power based on the signal instructing entrance into the standby state (STB) and the standby state release signal. The second switching element 148 is a control circuit in the power supply unit 124 and arranged on an input side of the first power supply unit 144. The third switching element 149 switches the supply of electric power to the second power supply unit 145 and the interruption of the electric power based on the standby signal (STB), the standby mode release signal, the signal instructing entrance into the standby 1 state (STB1), and the standby 1 state release signal. The third switching element 149 is a control circuit in the power supply unit 124 and arranged on an input side of the second power supply unit for optical system 145.

The first switching element 147, the second switching element 148, and the third switching element 149 can also be arranged on output sides of the power supply unit for main operating unit 142, the first power supply unit for optical system 144, and the second power supply unit for optical system 145, respectively. However, it is more desirable to arrange the first switching element 147, the second switching element 148, and the third switching element 149 on the input sides because it is possible to further reduce electric power consumed by the power supply unit 124 itself including the DC-DC converter.

The electric power consumed by the power supply unit 124 itself includes electric power necessary for processing for obtaining constant voltage. A value of the electric power depends not only on an actual output current but also on a maximum output current that can be output. Therefore, to reduce power consumption, it is effective to interrupt a power supply input to a power supply having a large maximum output current.

A mechanism of standby mode control by the standby-mode control unit 126 is explained in detail. First, a mechanism of control of the standby 1 state is explained. FIG. 8A is a timing chart of the standby 1 state control actually used in the embodiment.

When the signal instructing entrance into the standby 1 state (STB1) is received from the main operating unit 125 (time A in FIG. 8A), the standby-mode control unit 126 judges whether the optical-electrical hybrid integrated circuit 121 finally enters the standby 1 state. Even when the signal instructing entrance into the standby 1 state (STB1) is received from the input/output unit (not shown), the standby-mode control unit 126 performs the same judgment. When it is judged that the optical-electrical hybrid integrated circuit 121 enters the standby 1 state, the standby-mode control unit 126 transmits the signal instructing entrance into the standby 1 state (STB1) to the power supply unit 124 (time B in FIG. 8A).

When the signal instructing entrance into the standby 1 state (STB1) is received, the power supply unit 124 turns off the third switching element 149 and the first switching element 147 to thereby interrupt the supply of electric power to the second power supply unit 145 and the power supply unit 142 (time C in FIG. 8A). Thereafter, the optical-electrical hybrid integrated circuit 121 operates in the standby 1 state. As a result, power consumption of the optical-electrical hybrid integrated circuit 121 is substantially reduced.

In the standby 1 state, the first power supply unit 144 that supplies electric power to the temperature compensating unit 136 of the optical wiring unit 123 is operating. A reason for this is explained below. Because operations of the temperature compensating unit 136 include control concerning temperature, a large time constant is required compared with control of an electric circuit. Therefore, both the first power supply unit 144 and the second power supply unit 145 (which supplies electric power to the light-emitting element 131, the first optical demultiplexer 134, and the second optical demultiplexer 135 of the optical wiring unit 123) are simultaneously changed from an OFF state to an ON state, the temperature compensating unit 136 takes time to stabilize. During that time, it is necessary to stop the use of the optical wiring unit 123.

If this operation is repeated every time, a loss of arithmetic time occurs. Thus, when time in which the operation processing of the main operating unit 125 is suspended is within a fixed time, it is desirable to maintain the temperature compensating unit 136 in a lit state. Thus, a state in which the second power supply unit 145 and the power supply unit 142 are off but the first power supply unit 144 are maintained ON is set as the standby 1 state.

Even while the optical-electrical hybrid integrated circuit 121 is operating in the standby 1 state, electric power is continuously supplied to the standby-mode control unit 126 from the power supply unit 143. Thus, it is possible to perform standby mode control. For example, while the optical-electrical hybrid integrated circuit 121 is operating in the standby 1 state, when an inquiry signal about an operation state is input from the outside via the input/output unit (not shown), the standby-mode control unit 126 can perform control for returning a signal for informing that the optical-electrical hybrid integrated circuit 121 is in the standby 1 state.

While the optical-electrical hybrid integrated circuit 121 is operating in the standby 1 state, the standby-mode control unit 126 can always continuously transmit the signal for informing that the optical-electrical hybrid integrated circuit 1 is in the standby 1 state regardless of whether there is an inquiry from the outside. However, because the continuous transmission of the signal causes an increase in power consumption, it is desirable to adopt the form described above.

While the optical-electrical hybrid integrated circuit 121 is operating in the standby 1 state, when the standby 1 state release signal instructing release of the standby mode is received from the input/output unit (not shown) or the main operating unit 125 (time D in FIG. 8A), the standby-mode control unit 126 transmits the standby 1 state release signal to the power supply unit 124 (time E in FIG. 8A).

When the standby 1 state release signal is received, the power supply unit 124 turns on the third switching element 149 and the first switching element 147 based on the instruction of the sequencer 146 to thereby sequentially resume the supply of electric power to the second power supply unit 145 and the power supply unit 142 (time E in FIG. 8A). Consequently, the function of the main operating unit 125 employing the optical wiring unit 123 is enabled. In response to the resumption of the supply of electric power, the main operating unit 125 performs initialization processing such as confirmation of an internal memory state. Thus, it is possible to receive an instruction for signal processing from the input/output unit. In this way, the optical-electrical hybrid integrated circuit 121 operates in the normal state.

As described above, a normal operation state and an operation state in the standby 1 state are appropriately switched according to an operation processing state of the main operating unit. Consequently, the optical-electrical hybrid integrated circuit 121 can efficiently consume electric power while performing a normal operation processing without delaying a start time of the operation processing. As a result, it is possible to substantially reduce power consumption.

A mechanism of control of the standby mode is explained. After the optical-electrical hybrid integrated circuit 121 shifts to the standby 1 state, the standby-mode control unit 126 does not receive the standby 1 state release signal instructing release of the standby 1 state from the input/output unit (not shown) or the main operating unit 125 for a fixed time.

In such a case, when a predetermined time elapses after generation of the signal instructing entrance into the standby 1 state, the standby-signal generating unit 130 generates the standby signal (STB) instructing entrance into the standby mode (the standby state). The main operating unit 125 transmits the standby signal (STB) to the standby-mode control unit 126. At this point, the main operating unit 125 (the standby-signal generating unit 130) is already in a stopped state. However, the main operating unit 125 can create and transmit the standby signal (STB) by, for example, using electric charges stored in the circuits before the stop.

When the standby signal (STB) is received from the main operating unit 125, the standby-mode control unit 126 judges whether the optical-electrical hybrid integrated circuit 121 finally enters the standby mode. Even when the standby signal (STB) is received from the input/output unit (not shown), the standby-mode control unit 126 performs the same judgment. When it is judged that the optical-electrical hybrid integrated circuit 121 enters the standby mode, the standby-mode control unit 126 transmits the standby signal (STB) to the power supply unit 124.

When the standby signal (STB) is received, the power supply unit 124 turns off the second switching element 148 to thereby interrupt the supply of electric power to the first power supply unit 144. Thereafter, the optical-electrical hybrid integrated circuit 121 operates in the standby mode. As a result, power consumption of the optical-electrical hybrid integrated circuit 121 is substantially reduced.

Even while the optical-electrical hybrid integrated circuit 121 is operating in the standby mode, electric power is continuously supplied to the standby-mode control unit 126 from the power supply unit 143. Thus, it is possible to perform standby mode control. For example, while the optical-electrical hybrid integrated circuit 121 is operating in the standby mode, when an inquiry signal about an operation state is input from the outside via the input/output unit (not shown), the standby-mode control unit 126 can perform control for returning a signal for informing that the optical-electrical hybrid integrated circuit 121 is in the standby mode.

While the optical-electrical hybrid integrated circuit 121 is operating in the standby mode, the standby-mode control unit 126 can always continuously transmit the signal for informing that the optical-electrical hybrid integrated circuit 121 is in the standby mode regardless of whether there is an inquiry from the outside. However, because the continuous transmission of the signal causes an increase in power consumption, it is desirable to adopt the form described above.

While the optical-electrical hybrid integrated circuit 121 is operating in the standby mode, when the standby mode release signal instructing release of the standby mode is received from the input/output unit (not shown) or the main operating unit 125, the standby-mode control unit 126 transmits the standby mode release signal to the power supply unit 124.

When the standby mode release signal is received, the power supply unit 124 turns on the second switching element 148, the third switching element 149, and the first switching element 147 based on the instruction of the sequencer 146 to thereby sequentially resume the supply of electric power to the first power supply unit 144, the second power supply unit 145, and the power supply unit 142. Consequently, the function of the main operating unit 125 employing the optical wiring unit 123 is enabled. In response to the resumption of the supply of electric power, the main operating unit 125 performs initialization processing such as confirmation of an internal memory state. Thus, it is possible to receive an instruction for signal processing from the input/output unit. In this way, the optical-electrical hybrid integrated circuit 121 operates in the normal state.

As described above, an operation state in the standby 1 state, an operation state in the standby mode, and a normal operation state are appropriately switched according to an operation time in the standby 1 state and an operation processing state of the main operating unit. Consequently, the optical-electrical hybrid integrated circuit 121 can efficiently consume electric power while performing a normal operation processing. As a result, it is possible to substantially reduce power consumption.

In the embodiment, the standby-mode control unit 126 receives the signal instructing entrance into the standby 1 state (STB1) from the main operating unit 125 with inverted logic. In other words, the standby-signal generating unit 130 generates the signal instructing entrance into the standby 1 state (STB1) with inverted logic. This makes it possible to prevent a situation in which, when the optical-electrical hybrid integrated circuit 121 enters the standby 1 state and the supply of electric power to the main operating unit 125 is stopped, all signals output from the main operating unit 125 fall to 0 V and the signal instructing entrance into the standby 1 state (STB1) from the main operating unit 125 is apparently inverted. A reason for this is explained using FIG. 8B.

FIG. 8B is a timing chart of the standby 1 state control at the time when the standby-mode control unit 126 does not receive the signal instructing entrance into the standby 1 state (STB1) from the main operating unit 125 with inverted logic. When the signal instructing entrance into the standby 1 state (STB1) is received from the main operating unit 125 (time A in FIG. 8B) and the standby-mode control unit 126 judges that the optical-electrical hybrid integrated circuit 121 enters the standby 1 state, the standby-mode control unit 126 transmits the signal instructing entrance into the standby 1 state (STB1) to the power supply unit 124 (time B in FIG. 8B). When the signal instructing entrance into the standby 1 state (STB1) is received, the power supply unit 124 interrupts the supply of electric power to the second power supply unit 145 and the power supply unit 142 (time C in FIG. 8B). Thereafter, the optical-electrical hybrid integrated circuit 121 operates in the standby mode.

However, the main operating unit 125, the supply of electric power to which is interrupted, cannot maintain the signal instructing entrance into the standby 1 state (STB1) and automatically outputs 0 V (an L level) (time C in FIG. 8B). Then, the standby-mode control unit 126 considers that the signal instructing entrance into the standby 1 state (STB1) is inverted and outputs the standby 1 state release signal to the power supply unit 124 (time D in FIG. 8B). As a result, the second power supply unit 145 and the power supply unit 142 resume the supply of electric power. Simultaneously with the resumption of the supply of electric power, the main operating unit 125 outputs the signal instructing entrance into the standby 1 state (STB1) again (the signal (STB1) changes to an H level) (time E in FIG. 8B). Therefore, a state at time E is the same as a state at time A and the system automatically repeats the same operation (times E to H in FIG. 8B). As a result, the system falls into an oscillation state and cannot maintain the operation in the standby 1 state.

To prevent this problem, it is possible to design the arithmetic circuit of the standby-mode control unit 126 to use only a rising edge portion of the signal instructing entrance into the standby 1 state (STB1) from the main operating unit 125 (when the optical-electrical hybrid integrated circuit 121 enters the standby 1 state) and neglect a falling edge portion (when the optical-electrical hybrid integrated circuit 1 returns from the standby state). However, an area necessary for such an arithmetic circuit is by far the larger compared with an addition of only one NOT circuit in the case of the use of inverted logic.

By performing system design using inverted logic, it is possible to surely give, with simple circuit design, an instruction for the shift to the standby 1 state from the main operating unit 125 to the standby-mode control unit 126.

Similarly, in the embodiment, the standby-mode control unit 126 receives the standby signal (STB) from the main operating unit 125 with inverted logic. In other words, the standby-signal generating unit 130 creates the standby signal (STB) with inverted logic. This makes it possible to prevent a situation in which, when the optical-electrical hybrid integrated circuit 121 enters the standby mode and the supply of electric power to the main operating unit 125 is stopped, all signals output from the main operating unit 125 fall to 0 V and the standby signal (STB) from the main operating unit 45 is apparently inverted.

By performing system design using inverted logic in this way, it is possible to surely give, with simple circuit design, an instruction for the shift to the standby mode from the main operating unit 125 to the standby-mode control unit 126.

In the embodiment, the temperature compensating unit 136 performs temperature compensation using expansion and contraction of the piezo element. However, it is also possible to perform temperature control with other methods. For example, it is also possible to keep the temperature of the first optical demultiplexer 134 and the second optical demultiplexer 135 by building a heater in the temperature compensating unit 136 instead of the piezo element and controlling a voltage applied to the heater. When a bias voltage applied to the first optical demultiplexer 134 and the second optical demultiplexer 135 is changed, characteristics of the first optical demultiplexer 134 and the second optical demultiplexer 135 change. Thus, it is also possible to perform control of a bias voltage and offset a characteristic change due to temperature with a characteristic change due to the bias voltage making use of this characteristic. Besides, various modifications are possible without departing from the spirit of the present invention.

As described above, in the optical-electrical hybrid integrated circuit according to the fifth embodiment, it is possible to substantially reduce power consumption while guaranteeing normal operations of the circuits by providing the standby state in which the supply of electric power to the temperature compensating unit and the light-emitting element with large power consumption of the optical wiring unit and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

Moreover, in the optical-electrical hybrid integrated circuit according to the fifth embodiment, it is possible to substantially reduce power consumption without delaying a start time of the operation processing while guaranteeing normal operations of the circuits by providing the standby 1 state in which the supply of electric power to the light-emitting element with large power consumption of the optical wiring unit and the supply of electric power to the main operating unit that performs signal transmission using the optical wiring are interrupted. As a result, in an optical-electrical hybrid integrated circuit mounted on an apparatus represented by a portable apparatus in which a reduction of power consumption in the standby state is important, it is possible to enjoy the advantage of the optical wiring.

In the optical-electrical hybrid integrated circuits according to the first to fifth embodiment, the respective components including an integrated circuit are connected to one another using any one of an electric signal and an optical signal or both and function as one circuit as a whole. Therefore, in a typical example, all the components are integrated and mounted on an identical chip. However this is not always a necessary requirement in implementation of the first to fifth embodiments.

For example, it is also possible to apply the first to fifth embodiments when chips including a plurality of integrated circuits enclosed in one package are connected to one another using any one of an electric signal and an optical signal or both and the one package functions as a circuit. In this case, a part of any one of electric wirings and optical waveguides or both is formed on semiconductor substrates and another part thereof is provided between the semiconductor substrate in the package.

It is also possible to apply the first to fifth embodiments when chips including integrated circuits sealed in a plurality of packages mounted on a normal circuit board are connected to one another using any one of an electric signal and an optical signal or both and function as one circuit on the circuit board. In this case, a part of any one of electric wirings and optical waveguides or both is formed on semiconductor substrates, another part thereof is provided in the packages, and still another part is provided among the plural packages including on the circuit board.

A method of manufacturing the optical-electrical hybrid integrated circuits according to the first to fifth embodiments is explained.

Figure 9:
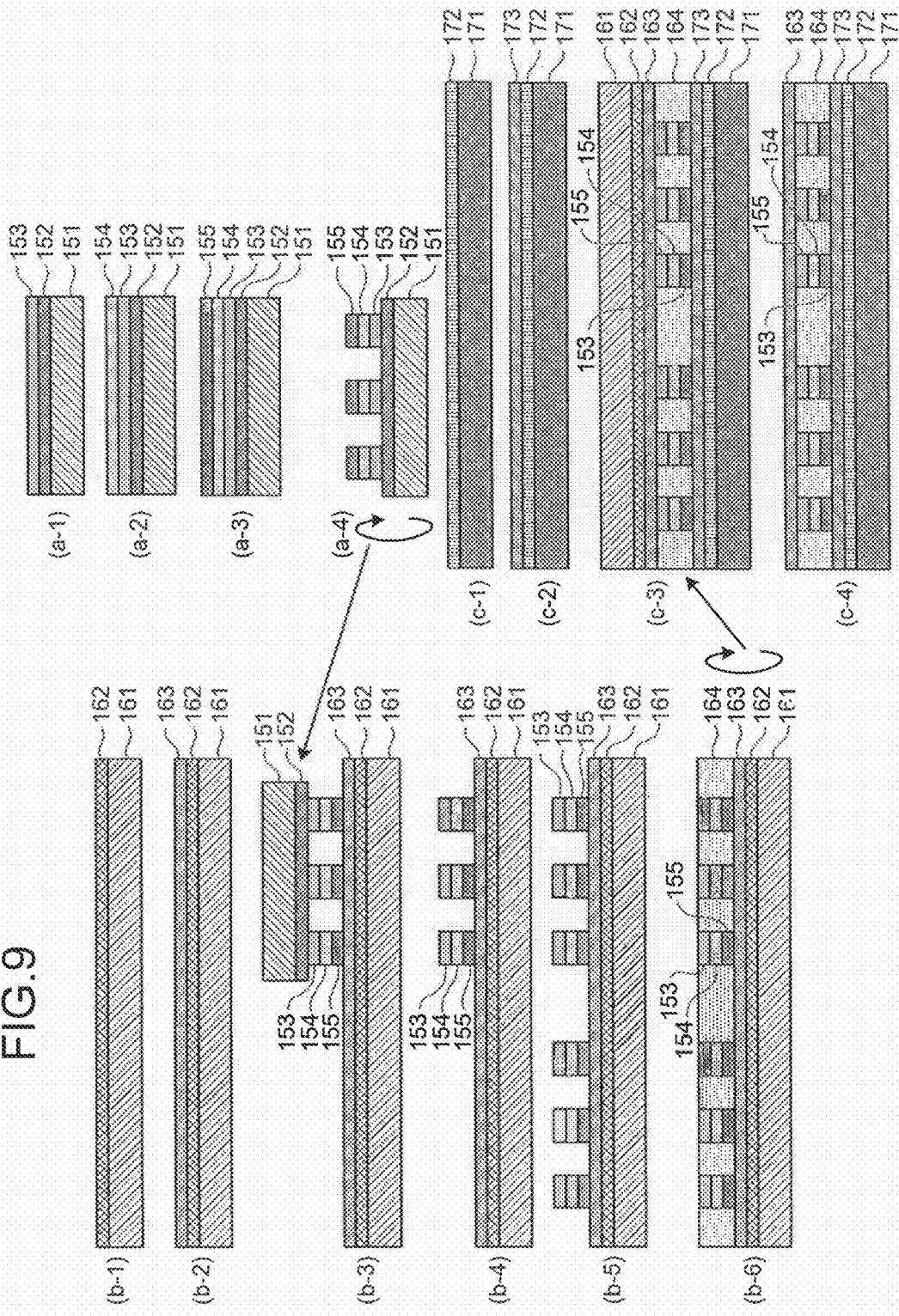
FIG. 9 is a process chart in section for the optical-electrical hybrid integrated circuits according to the first to fifth embodiments.

First, as shown in (a-1) in FIG. 9, ion implantation of In and Sb and crystallinity recovery annealing is applied to a GaAs substrate 151 having a diameter of 3 inches to form a release layer 152 and a buffer layer 153. As shown in (a-2) in FIG. 9, an optical element layer 154 including a GaInNAs light-emitting layer and an InGaAs light-receiving layer (in the optical-electrical hybrid integrated circuit according to the fifth embodiment, the optical element layer 154 including the InGaAs light-receiving layer and an optical demultiplexer of a resonator type formed of GaInAsP) is formed by epitaxial growth of a III-V semiconductor. Although not shown in the figure, a draw-out wiring section is formed. Subsequently, as shown in (a-3) in FIG. 9, a buffer layer 155 formed of $SiO_2$ is formed by a sputtering method and an uppermost portion thereof is polished. As shown in (a-4) in FIG. 9, sections unnecessary as an optical element unit including a wafer peripheral section are removed by a photolithography process and etching.

On the other hand, as shown in (b-1) in FIG. 9, hydrogen ions are implanted into an SOI substrate 161 having a diameter of 12 inches to form a release layer 162 on a bulk side Si. As shown in (b-2) in FIG. 9, a surface side Si layer is processed to form an optical waveguide layer 163 formed of SI embedded in an $SiO_2$ film (in the optical-electrical hybrid integrated circuits according to the second to fourth embodiments, an optical modulator formed of lithium niobate and the optical waveguide layer 163 formed of Si embedded in an $SiO_2$ film) and an upper most portion thereof is polished. As shown in (b-3) in FIG. 9, a substrate obtained in (a-4) in FIG. 9 is vertically reversed and bonded in predetermined positions using direct bonding. As shown in (b-4) in FIG. 9, substrate release light is irradiated from a rear surface of the GaAs substrate 151 to separate the substrate from the release layer 152. As shown in (b-S) in FIG. 9, the substrate obtained in (a-4) in FIG. 9 is sequentially bonded in other desired positions on the SOI substrate 161. As shown in (b-6) in FIG. 9, an $SiO_2$ film 164 is formed over the entire surface of the substrate by a plasma CVD method using TEOS and the surface thereof is polished to be planarized.

Moreover, as shown in (c-1) in FIG. 9, a CMOS circuit layer 172 including an electric circuit wiring is formed on an Si substrate 171 having a diameter of 12 inches using a normal CMOS process. As shown in (c-2) in FIG. 9, an $SiO_2$ film 173 is formed over the entire surface of the substrate by the plasma CVD method using TEOS and the surface thereof is polished to be planarized. As shown in (c-3) in FIG. 9, a substrate obtained in (b-6) in FIG. 9 is vertically reversed and bonded in predetermined positions using direct bonding. As shown in (c-4) in FIG. 9, substrate release light is irradiated from a rear surface of the SOI substrate 161 using light having a wavelength different from that of the light described above to separate the substrate from the release layer 162. Although not shown in the figure, a wiring layer formation process for connecting the optical element layer 154 and the CMOS circuit layer 172 is performed. Finally, it is possible to form an optical/electrical semiconductor device through a normal semiconductor device manufacturing process such as final passivation formation and pad formation.

The NMOSFET that drives the light-emitting element 12 (in the optical-electrical hybrid integrated circuit according to the second to fourth embodiments, the optical modulators 37, 65, 66, 67, 68, 99, 100, 101, and 102; in the optical-electrical hybrid integrated circuit according to the fifth embodiment, the optical demultiplexers 134 and 145) is provided in the optical wiring unit. Because power consumption of the light-emitting element 12 (in the optical-electrical hybrid integrated circuit according to the second to fourth embodiments, the optical modulators 37, 65, 66, 67, 68, 99, 100, 101, and 102; in the optical-electrical hybrid integrated circuit according to the fifth embodiment, the optical demultiplexers 134 and 145) is large, an FET having a large driving force is necessary. Therefore, it is convenient to manufacture this FET and an FET of the operating unit on separate substrates under different process conditions. It is also possible to provide the NMOSFET that drives the light-emitting element 12 (in the optical-electrical hybrid integrated circuit according to the second to fourth embodiments, the optical modulators 37, 65, 66, 67, 68, 99, 100, 101, and 102; in the optical-electrical hybrid integrated circuit according to the fifth embodiment, the optical demultiplexers 134 and 145) in the main operating units 5, 45, and 125 by simplifying the manufacturing process and improving the design of the FET. In this case, there is an advantage that a reduction in cost can be realized.

As described above, according to the method of manufacturing the optical-electrical hybrid integrated circuits according to the first to fifth embodiments, it is possible to provide a method of manufacturing an optical-electrical hybrid integrated circuit with less power consumption.

Figure 10A:
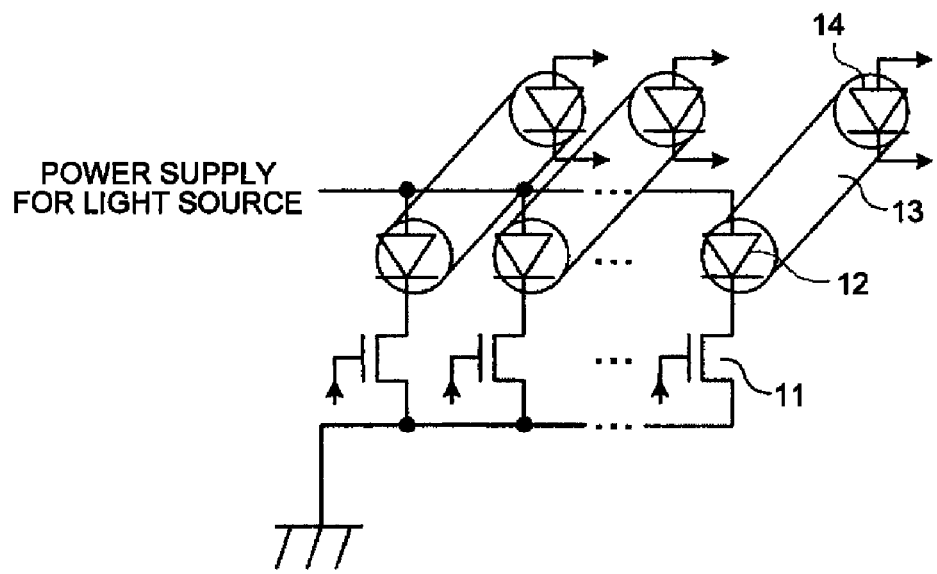
FIGS. 10A and 10B are schematic diagrams of a modification of an optical-electrical hybrid integrated circuit.
Figure 10B:
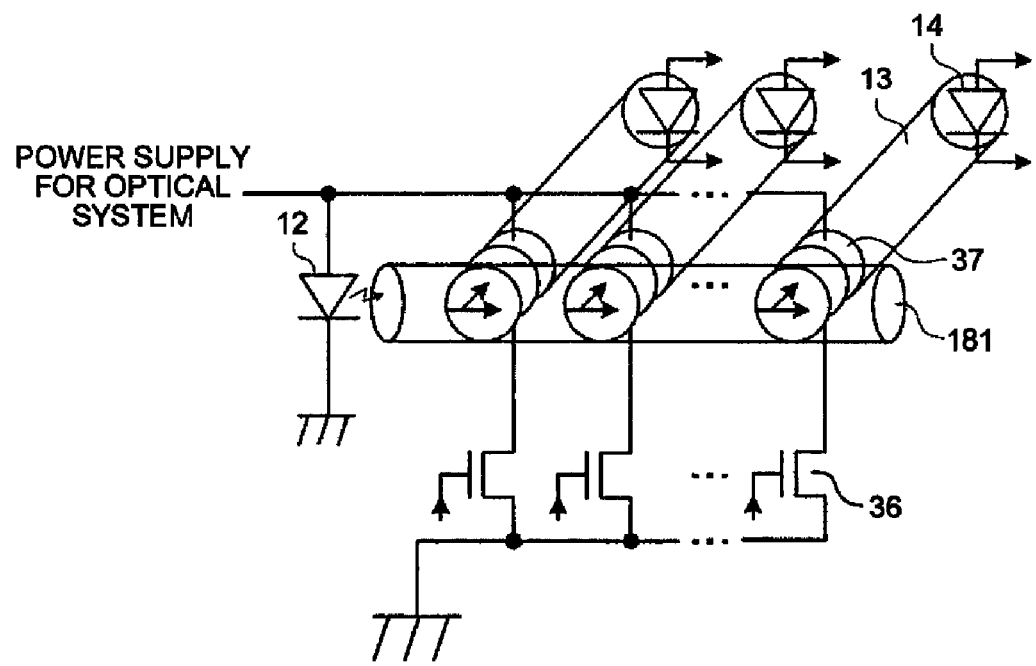

The present invention is not limited to the embodiments described above. In the figures for explaining the first and second embodiments, only a pair of optical wirings are shown. However, because a plurality of optical wirings are used in an actual optical-electrical hybrid integrated circuit, as shown in FIGS. 10A and 10B, in general, a plurality of elements are connected in parallel. It is also possible to connect one output to two or more inputs. The optical waveguide 13 only has to be branched and connected to different photodetecting elements 14.

In the embodiments, GaInNAs is used for the light-emitting element 12. However, it is also possible to use other materials such as GaInAsP. In the embodiments, InGaAs is used for the photodetecting element 14. However, it is also possible to use other materials such as Ge and GaSb. In the embodiments, Si is used for the optical waveguide 13 and the optical waveguide 181. However, it is also possible to use other materials such as SiN and SiON. The optical modulator 37 is not limited to an optical modulator of a phase modulation type (an interference type) employing lithium niobate. It is also possible to use an optical modulator of an intensity modulation type (an absorption type) employing InGaAsP. Various modifications of the present invention are possible without departing from the spirit of the present invention.

According to the present invention, it is possible to provide an optical-electrical hybrid integrated circuit that substantially reduces power consumption while guaranteeing normal operations of circuits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical-electrical hybrid integrated circuit comprising:
    an operating unit that includes a first operating block that performs a prescribed operation, a second operating block that performs a prescribed operation, and a standby-state-signal generating unit that generates a standby state signal for switching between a standby state and an operation state of the operating unit;
    an optical-signal transmitting unit that is connected to the first operating block and the second operating block and converts an electric signal, which is a result of the operation in the first operating block, into an optical signal, transmits the optical signal, converts the transmitted optical signal back into an electric signal, and then applies the electric signal converted from the optical signal to the second operating block;
    a power supply unit that supplies an electric power to the first operating block, the second operating block, and the standby-state-signal generating unit and the optical-signal transmitting unit; and
    a power-supply control unit that controls a supply of the electric power to the first operating block, the second operating block, and the standby-state-signal generating unit and a supply of the electric power to the optical-signal transmitting unit, wherein
    the power-supply control unit controls the supply of the electric power to the optical-signal transmitting unit and the supply of the electric power to the first operating block, the second operating block, and the standby-state-signal generating unit in response to the standby state signal.

2. The optical-electrical hybrid integrated circuit according to claim 1, wherein the standby-state-signal generating unit generates the standby state signal with inverted logic by receiving a signal indicating that an operation processing is suspended from the first operating block and the second operating block with inverted logic.

3. The optical-electrical hybrid integrated circuit according to claim 1, wherein the power supply unit includes at least one switch unit that connects or disconnects the supply of the electric power to the first operating block, the second operating block, and the standby-state-signal generating unit and the supply of the electric power to the optical-signal transmitting unit.

4. The optical-electrical hybrid integrated circuit according to claim 3, wherein the switch unit is arranged on an input side of a part of the power supply unit to supply the electric power to the first operating block, the second operating block, and the standby-state-signal generating unit and an input side of a part of the power supply unit to supply the electric power to the optical-signal transmitting unit.

5. The optical-electrical hybrid integrated circuit according to claim 1, wherein
    the operating unit includes at least one first switch unit that connects or disconnects the supply of the electric power to each part of the operating unit,
    the optical-signal transmitting unit includes at least one second switch unit that connects or disconnects the supply of the electric power to each part of the optical-signal transmitting unit, and
    the power-supply control unit controls the first switch unit and the second switch unit.

6. The optical-electrical hybrid integrated circuit according to claim 1, wherein the power supply unit further supplies the electric power to the power-supply control unit.

7. The optical-electrical hybrid integrated circuit according to claim 1, wherein the optical-signal transmitting unit includes a set of a light-emitting unit, a photodetecting unit, and an optical waveguide.

8. The optical-electrical hybrid integrated circuit according to claim 1, wherein the optical-signal transmitting unit includes a set of a light-emitting unit, an optical modulating unit, a photodetecting unit, and an optical waveguide.

* * * * *